US010595202B2

(12) United States Patent
Momchilov et al.

(10) Patent No.: US 10,595,202 B2
(45) Date of Patent: Mar. 17, 2020

(54) DYNAMIC ACCESS TO HOSTED APPLICATIONS

(71) Applicant: Citrix Systems, Inc., Fort Lauderdale, FL (US)

(72) Inventors: Georgy Momchilov, Parkland, FL (US); Ashish Gujarathi, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 167 days.

(21) Appl. No.: 15/472,685

(22) Filed: Mar. 29, 2017

(65) Prior Publication Data

US 2017/0339564 A1    Nov. 23, 2017

Related U.S. Application Data

(60) Provisional application No. 62/340,025, filed on May 23, 2016.

(51) Int. Cl.
*H04L 29/06* (2006.01)
*H04W 12/08* (2009.01)
(Continued)

(52) U.S. Cl.
CPC ............ *H04W 12/08* (2013.01); *G06F 9/452* (2018.02); *G06F 9/45558* (2013.01);
(Continued)

(58) Field of Classification Search
CPC .... G06F 9/452; G06F 9/45558; G06F 21/604; G06F 21/629; H04L 63/10; H04L 63/107; H04W 4/50; H04W 12/08
See application file for complete search history.

(56) References Cited

U.S. PATENT DOCUMENTS

2013/0160099 A1    6/2013   Fitzpatrick, III
2014/0108649 A1*   4/2014   Barton ............... G06F 9/45533
                                                      709/224
(Continued)

FOREIGN PATENT DOCUMENTS

WO    2016022712 A1    2/2016

OTHER PUBLICATIONS

Jul. 24, 2017 (WO) International Search Report and Written Opinion—App. PCT/US2017/033746.

*Primary Examiner* — Jeffrey C Pwu
*Assistant Examiner* — Thong P Truong
(74) *Attorney, Agent, or Firm* — Banner & Witcoff, Ltd.

(57) ABSTRACT

Methods, systems, and computer-readable media for providing an enrolled device with smart access to hosted applications are presented. In some embodiments, a computing platform having at least one processor, a memory, and a communication interface may receive, via the communication interface, end point analysis information associated with an enrolled device. Subsequently, the computing platform may analyze the end point analysis information associated with the enrolled device to determine whether to selectively enable or disable hosted application functionality based on one or more smart access policies. Then, the computing platform may provide, via the communication interface, to the enrolled device, a hosted application experience based on analyzing the end point analysis information associated with the enrolled device and determining whether to selectively enable or disable the hosted application functionality based on the one or more smart access policies.

20 Claims, 21 Drawing Sheets

(51) Int. Cl.
*G06F 9/451* (2018.01)
*G06F 9/455* (2018.01)
*H04W 12/00* (2009.01)
*H04W 4/50* (2018.01)
*G06F 21/60* (2013.01)
*G06F 21/62* (2013.01)
*H04L 29/08* (2006.01)

(52) U.S. Cl.
CPC .......... *G06F 21/604* (2013.01); *G06F 21/629* (2013.01); *H04L 63/10* (2013.01); *H04L 63/107* (2013.01); *H04W 4/50* (2018.02); *H04W 12/0027* (2019.01); *G06F 2009/45587* (2013.01); *H04L 63/0807* (2013.01); *H04L 63/0876* (2013.01); *H04L 63/20* (2013.01); *H04L 67/08* (2013.01); *H04W 12/00505* (2019.01)

(56) References Cited

U.S. PATENT DOCUMENTS

2014/0189777 A1* 7/2014 Viswanathan ........ H04L 63/105
 726/1
2014/0297839 A1 10/2014 Qureshi

* cited by examiner

DYNAMIC ACCESS TO HOSTED APPLICATIONS

CROSS-REFERENCE TO RELATED APPLICATIONS

This application claims the benefit of priority to U.S. Patent Application Ser. No. 62/340,025, filed May 23, 2016, and entitled "PROVIDING MOBILE DEVICES WITH SMART ACCESS TO HOSTED APPLICATIONS," which is hereby incorporated by reference in its entirety for all purposes.

FIELD

Aspects of the disclosure relate to computer hardware and software. In particular, one or more aspects of the disclosure relate to computer hardware and software for providing an enrolled device with smart access to hosted applications.

BACKGROUND

Enterprise organizations and their employees and other associated users are increasingly using mobile computing devices to engage in a variety of functions, such as sending and receiving email, managing calendars and tasks, creating and viewing content, accessing and modifying enterprise information, and executing other functions. As such mobile devices are increasingly adopted and used, it is increasingly important for organizations to control and/or otherwise manage how such devices are used and/or what information they can access so as to protect the safety and security of enterprise information and other enterprise resources. In some instances, however, this may present technical challenges.

SUMMARY

Aspects of the disclosure provide technical solutions that may address and overcome one or more technical challenges associated with controlling and/or managing access to enterprise information and other enterprise resources by mobile devices and/or mobile applications.

Current end point analysis (EPA) technology works on desktop computing devices, which are typically running desktop operating systems. Such current end point analysis technology, however, cannot be applied to mobile computing devices or mobile operating systems.

Aspects of the disclosure relate to ways of providing end point analysis functionality on mobile computing devices and mobile applications. Enabling "smart access" from mobile devices (which may, e.g., include providing end point analysis functionality on mobile computing devices and mobile applications) may be important because mobile devices may be used from remote or insecure locations and might be easily displaced or hacked, which may include such a device being jailbroken or rooted. As illustrated in greater detail below, such smart access can be designed to leverage rich mobile device management (MDM) and/or mobile application management (MAM) end point analysis functionality on mobile devices to provide enhanced security. There currently are not any existing products that use mobile device management (MDM) or mobile application management (MAM) end point analysis functionality to provide Smart Access in connection with virtual applications.

As illustrated in greater detail below, aspects of the disclosure provide smart access for high definition experience (HDX) hosted applications in instances in which such applications are accessed by mobile devices. Such smart access is provided by leveraging rich MDM-based end point analysis from managed devices as input to smart access policies. Additionally or alternatively, such smart access is provided by leveraging rich MAM-based end point analysis from managed or unmanaged devices as input to smart access policies. Additionally or alternatively, the enhanced smart access (which may, e.g., be provided in accordance with one or more aspects of the disclosure) may restrict the availability of a high definition experience (HDX) application and/or specific HDX session redirection features based on the rich MDM end point analysis and/or the MAM end point analysis.

For example, a computing platform having at least one processor, a memory, and a communication interface may receive, via the communication interface, end point analysis information from a mobile device. Subsequently, the computing platform may determine, based on one or more smart access policies and the end point analysis information received from the mobile device, whether to restrict availability of a hosted high definition experience (HDX) application or one or more specific HDX session features to the mobile device. Based on determining to restrict the availability of the hosted HDX application or the one or more specific HDX session features to the mobile device, the computing platform may restrict the availability of the hosted HDX application or the one or more specific HDX session features to the mobile device.

In some instances, the end point analysis information received from the mobile device may include mobile device management (MDM) end point analysis information. In some instances, the end point analysis information received from the mobile device may include mobile application management (MAM) end point analysis information.

In accordance with one or more embodiments, a computing platform having at least one processor, a communication interface, and memory may receive, via the communication interface, end point analysis information associated with an enrolled device. Subsequently, the computing platform may analyze the end point analysis information associated with the enrolled device to determine whether to selectively enable or disable hosted application functionality based on one or more smart access policies. Then, the computing platform may provide, via the communication interface, to the enrolled device, a hosted application experience based on analyzing the end point analysis information associated with the enrolled device and determining whether to selectively enable or disable the hosted application functionality based on the one or more smart access policies.

In some embodiments, receiving the end point analysis information associated with the enrolled device may include receiving the end point analysis information associated with the enrolled device from the enrolled device. In some embodiments, receiving the end point analysis information associated with the enrolled device may include receiving the end point analysis information associated with the enrolled device from an enterprise mobility management server.

In some embodiments, the enrolled device may be registered with an enterprise mobility management server to enroll the enrolled device in at least one policy enforcement scheme implemented by the enterprise mobility management server prior to the end point analysis information associated with the enrolled device being received. In some instances, receiving the end point analysis information associated with the enrolled device may include receiving a unique device identifier associated with the enrolled device. In addition, the unique device identifier associated with the enrolled device may be generated by the enterprise mobility management server during enrollment of the enrolled device in the at least one policy enforcement scheme implemented by the enterprise mobility management server.

In some embodiments, receiving the end point analysis information associated with the enrolled device may include receiving one or more compliance tags generated by an enterprise mobility management server for the enrolled device. In some instances, the one or more compliance tags may be generated by the enterprise mobility management server for the enrolled device based on a mobile device management (MDM) policy enforcement scheme. In some instances, the one or more compliance tags may be generated by the enterprise mobility management server for the enrolled device based on a mobile application management (MAM) policy enforcement scheme. In some instances, the one or more compliance tags may be generated by the enterprise mobility management server for the enrolled device based on a mobile content management (MCM) policy enforcement scheme.

In some embodiments, analyzing the end point analysis information associated with the enrolled device to determine whether to selectively enable or disable the hosted application functionality based on the one or more smart access policies may include determining to enable full hosted application functionality. In some embodiments, analyzing the end point analysis information associated with the enrolled device to determine whether to selectively enable or disable the hosted application functionality based on the one or more smart access policies may include determining to enable partial hosted application functionality. In some embodiments, analyzing the end point analysis information associated with the enrolled device to determine whether to selectively enable or disable the hosted application functionality based on the one or more smart access policies may include determining to disable partial hosted application functionality. In some embodiments, analyzing the end point analysis information associated with the enrolled device to determine whether to selectively enable or disable the hosted application functionality based on the one or more smart access policies may include determining to disable full hosted application functionality.

These features, along with many others, are discussed in greater detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and in which.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
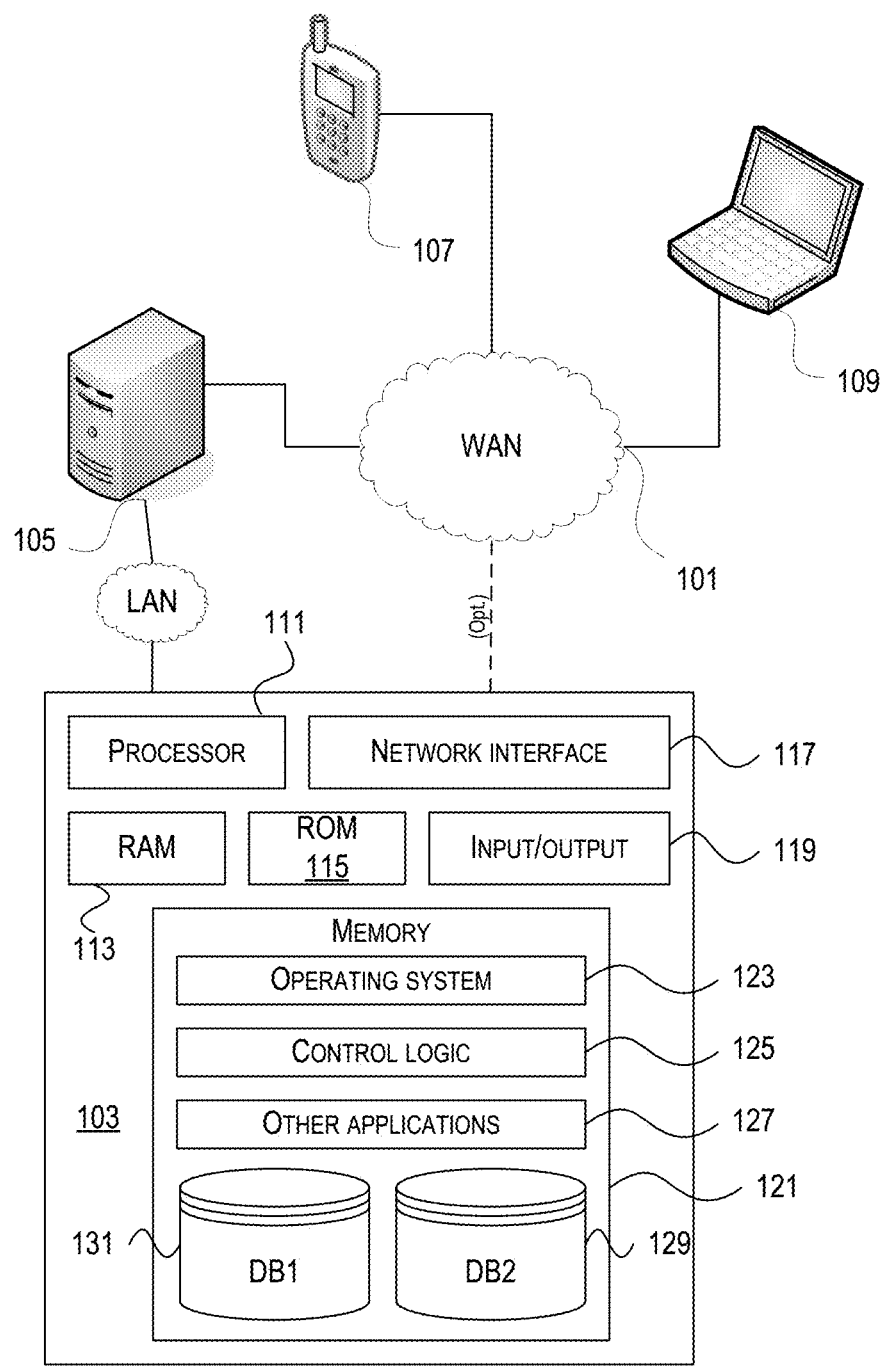
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
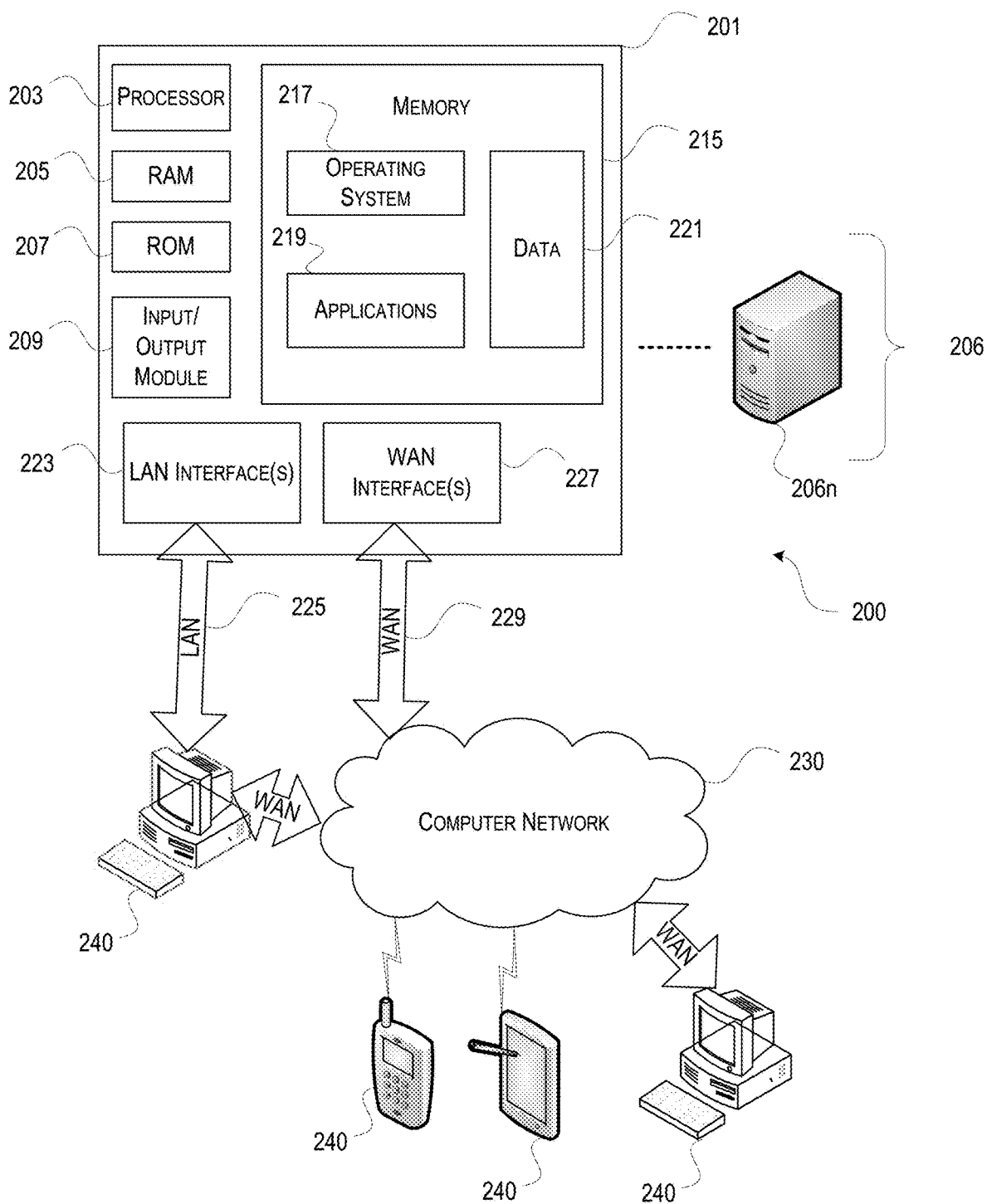
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
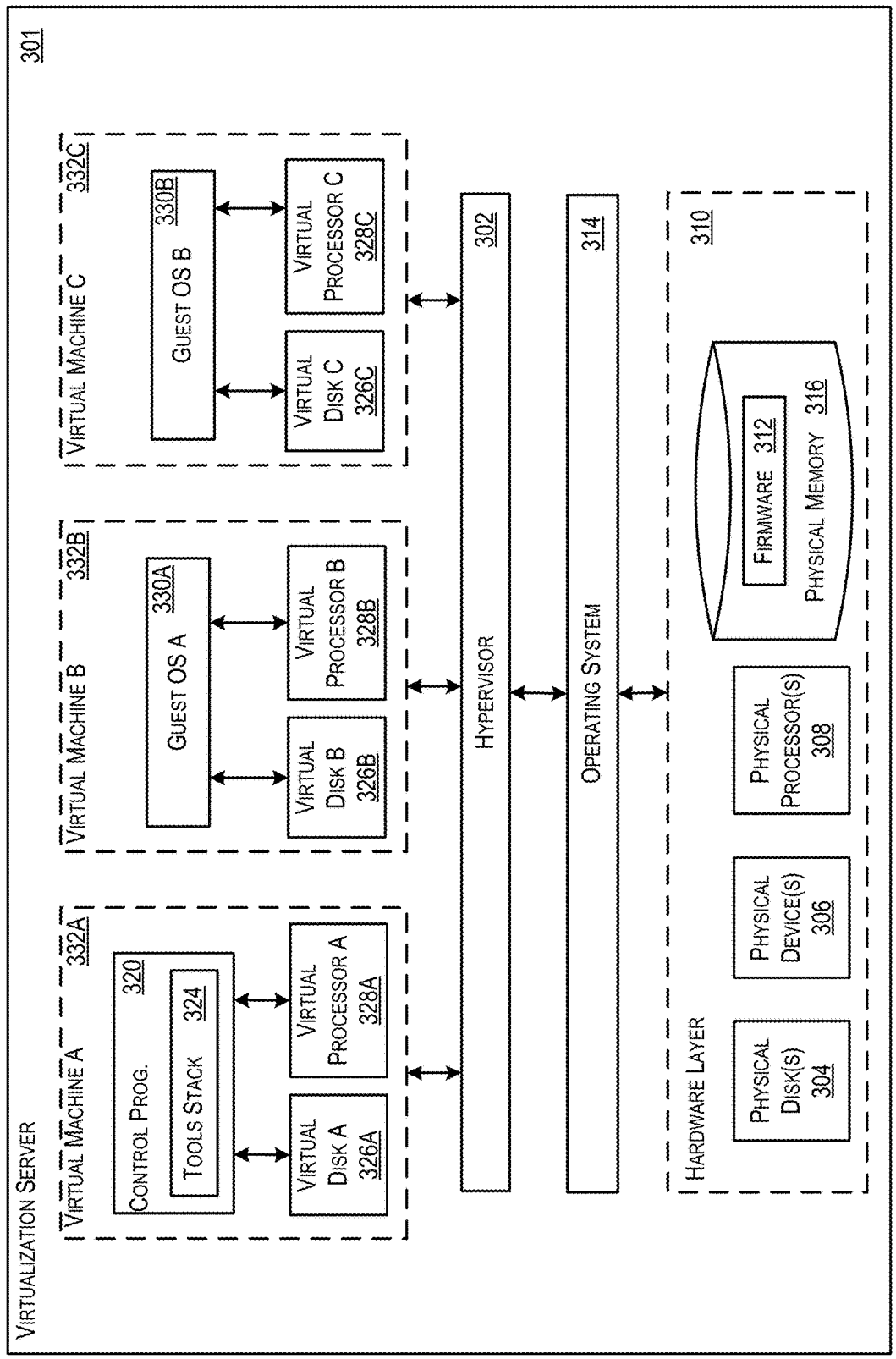
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
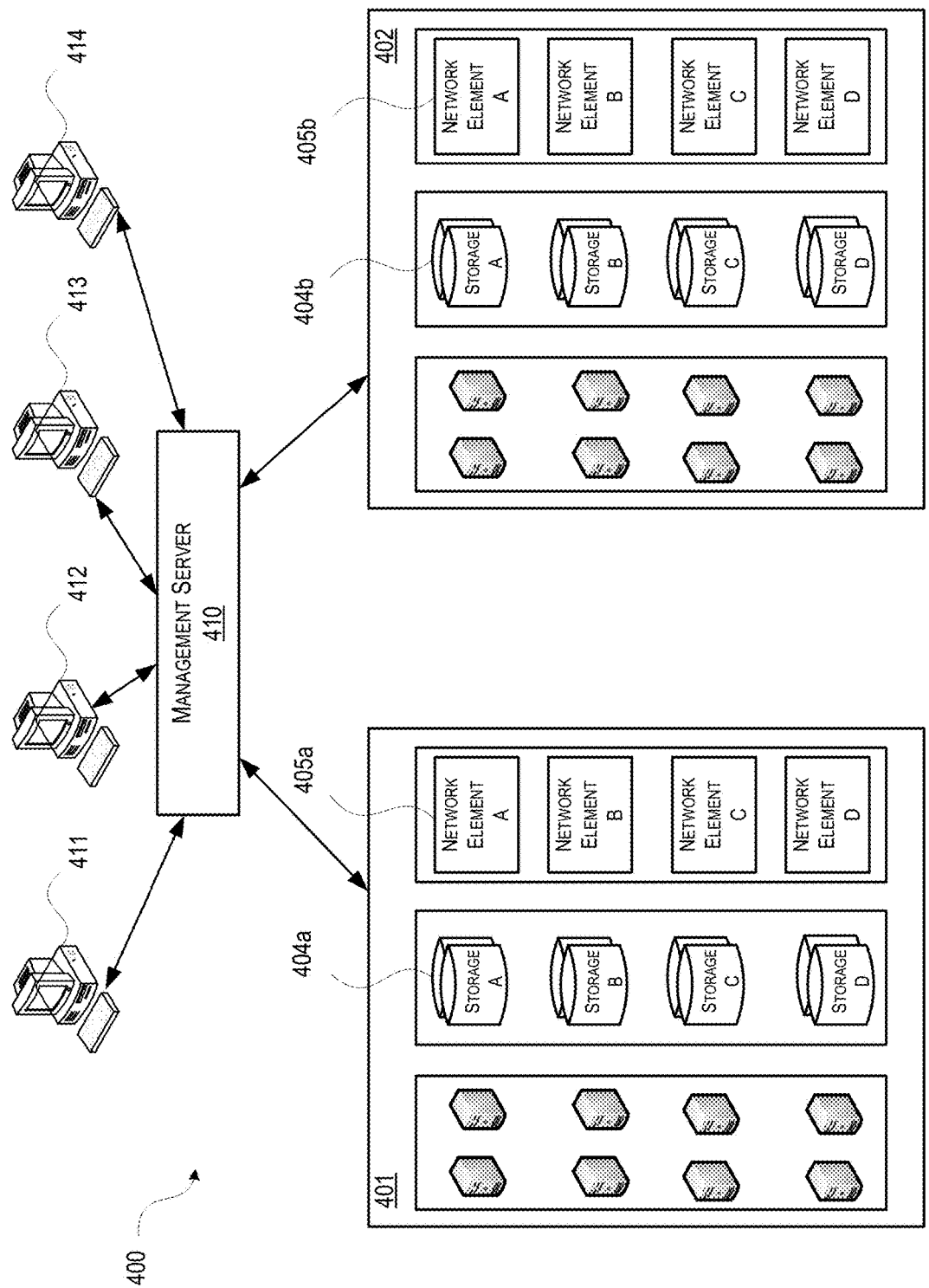
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
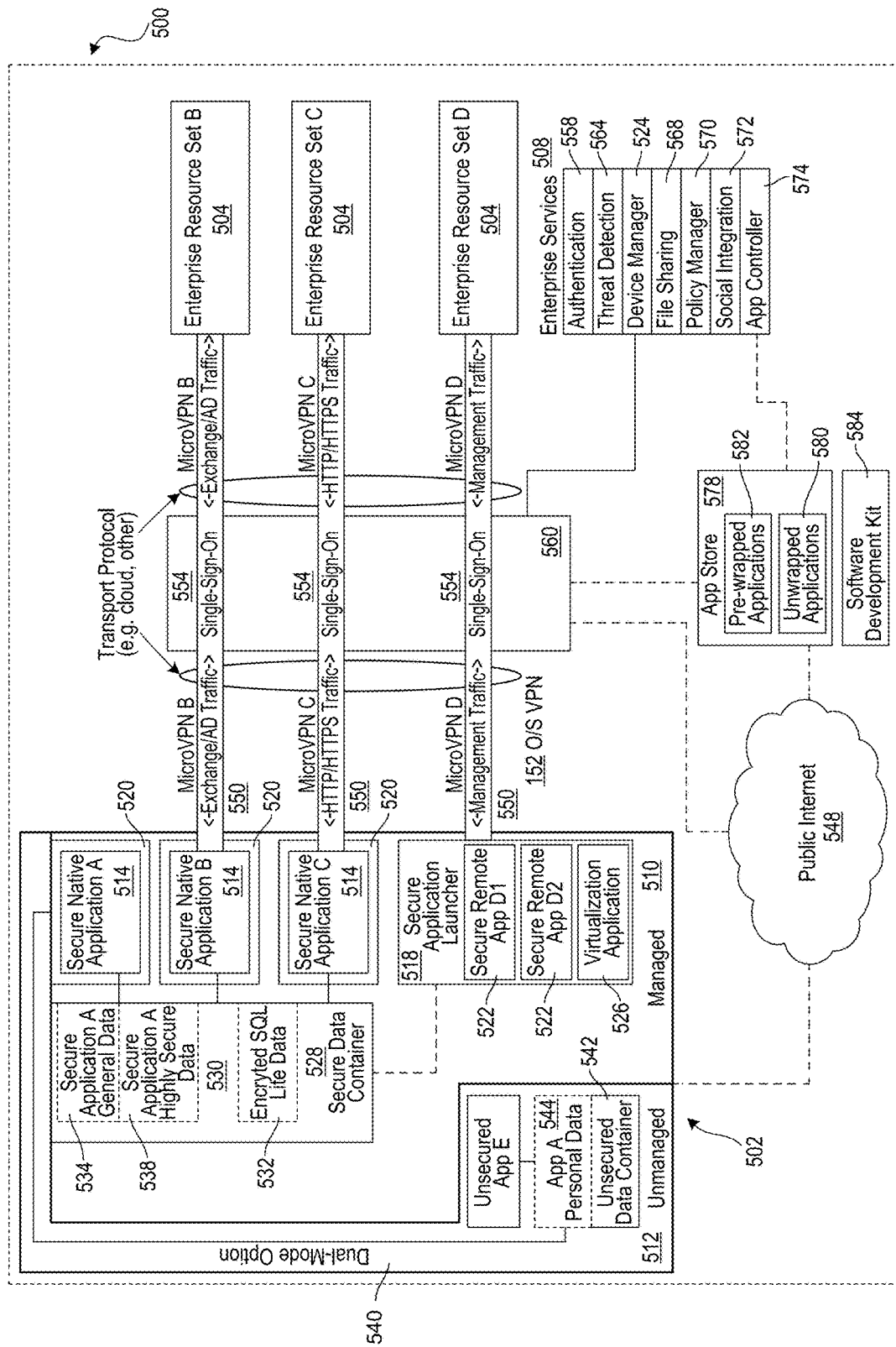
FIG. 5 depicts an illustrative enterprise mobility management system in accordance with one or more illustrative aspects described herein.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
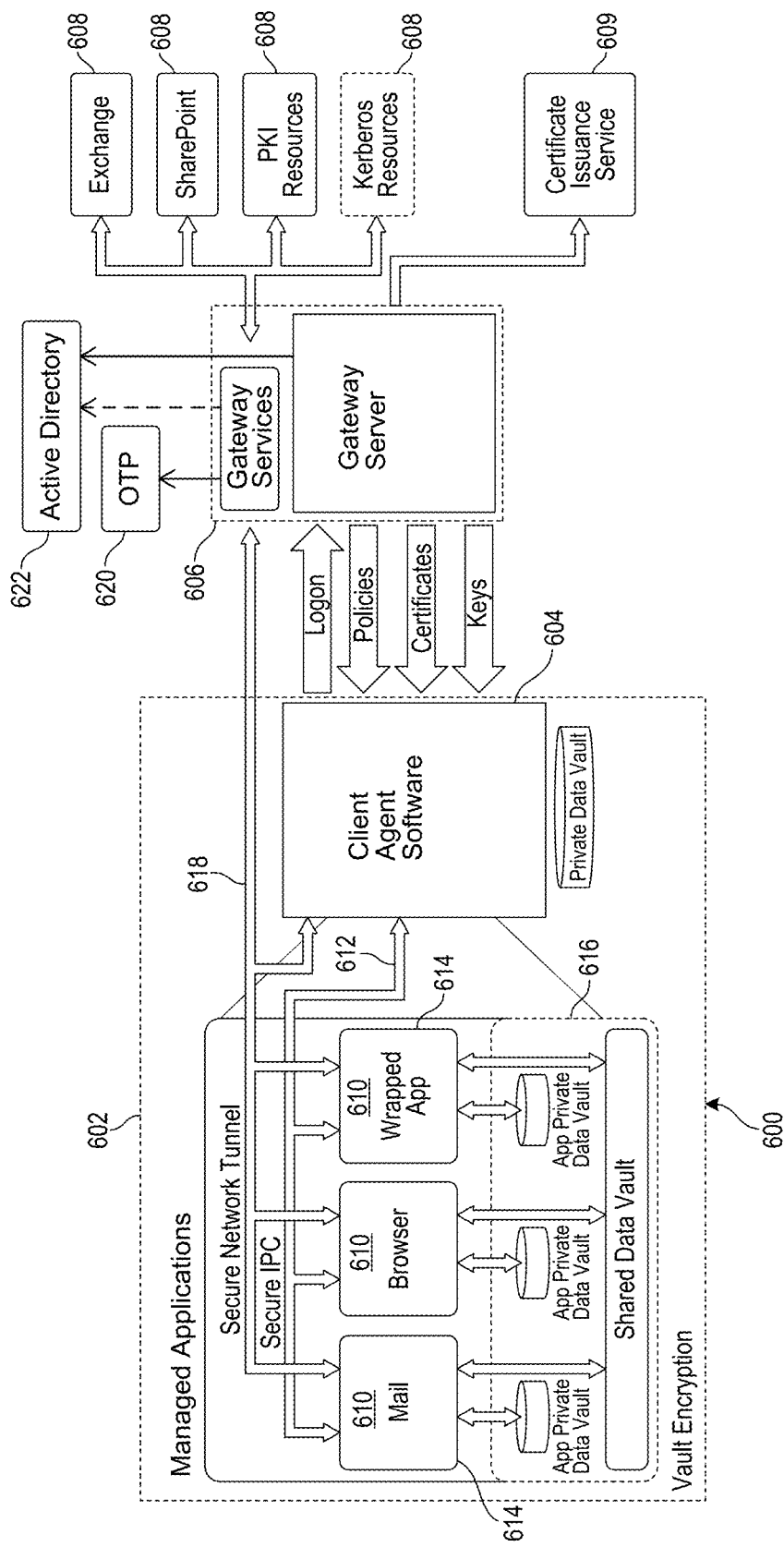
FIG. 6 depicts another illustrative enterprise mobility management system in accordance with one or more illustrative aspects described herein.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in FIG. 6 are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The Secure interprocess communication (IPC) links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Providing Mobile Devices with Smart Access to Hosted Applications

One or more aspects of the disclosure may incorporate, be embodied in, and/or be implemented using one or more of the computer system architecture, remote-access system architecture, virtualized (hypervisor) system architecture, cloud-based system architecture, and/or enterprise mobility management systems discussed above in connection with FIGS. 1-6. In addition, the following acronyms may be used in the disclosure: End Point Analysis (EPA); Desktop Delivery Controller (DDC); Mobile Application Management (MAM); Mobile Device Management (MDM); Mobile Device Experience (MDX); NetScaler Gateway (NSG); Proof of Concept (POC); Shared Secret Vault (SSV); Store-Front (SF); WorxHome (WH); XenApp (XA); XenDesktop (XD); and XenMobile Server (XMS).

As discussed above, aspects of the disclosure provide smart access for high definition experience (HDX) hosted applications in instances in which such applications are accessed by mobile devices. Such smart access may be provided by leveraging rich MDM-based end point analysis from managed devices as input to smart access policies. Additionally or alternatively, such smart access is provided by leveraging rich MAM-based end point analysis from managed or unmanaged devices as input to smart access policies. Additionally or alternatively, the enhanced smart access (which may, e.g., be provided in accordance with one or more aspects of the disclosure) may restrict the availability of HDX application and/or specific HDX session redirection features based on the rich MDM end point analysis and/or the MAM end point analysis.

Figure 7:
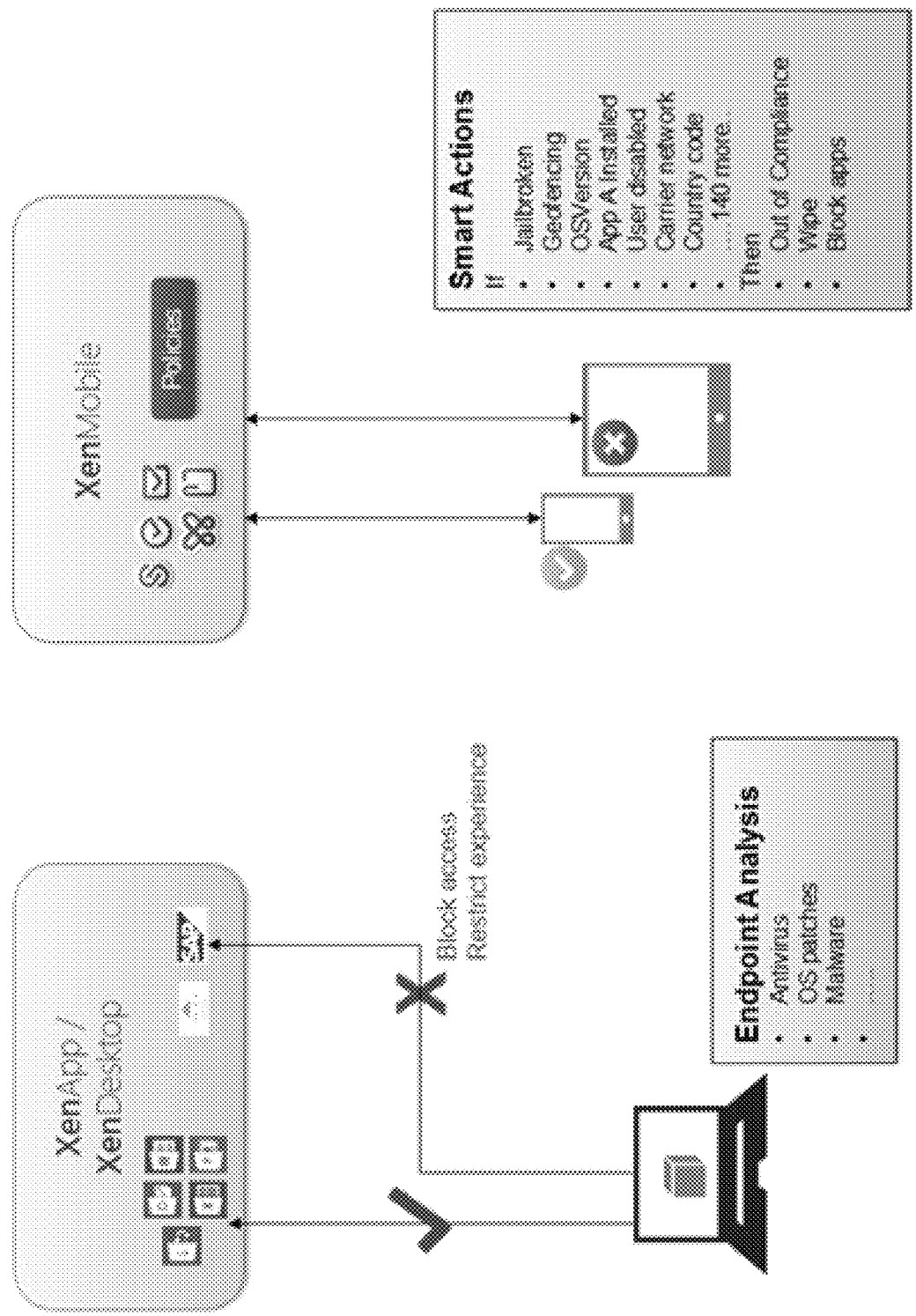
FIGS. 7-16 depict examples related to providing mobile devices with smart access to hosted applications in accordance with one or more illustrative aspects described herein.

FIG. 7 illustrates an example of how CITRIX XenApp and CITRIX XenDesktop may provide "Smart Access" at present (e.g., with respect to a desktop computing device). As discussed above, such current end point analysis (EPA) technology works on desktop computing devices, which are typically running desktop operating systems such as MICROSOFT WINDOWS or APPLE MAC OS X. Such current end point analysis technology, however, cannot be applied to mobile computing devices or mobile operating systems.

One or more aspects of the disclosure may provide technical solutions that overcome one or more limitations of the prior art and/or current technology. In particular, one or more aspects of the disclosure may provide the following features. For example, one or more aspects of the disclosure may apply MDM-based and/or MAM-based end point analysis to provide advanced smart access for HDX applications, which may include enumeration, launching, enforcing, and/or applying HDX session policies. In some instances, a "simple" implementation model may be utilized in which a single compliance tag is used to indicate whether a particular mobile device is in or out of compliance (e.g., with one or more policies). In other instances, an "advanced" implementation model may be utilized in which one or more custom compliance tags are used based on a rich end point analysis performed using MDM technology and/or MAM technology, such as an MDM agent and/or an MAM wrapper.

An Administrative user interface may be provided via which compliance tags may be configured and/or Smart Access policy configuration may be defined. For example, one or more compliance tags may be defined and/or otherwise used as either negative tags (e.g., exclusion tags) or positive tags (e.g., assertion tags, which may, for instance, enable a specific feature).

Figure 8:
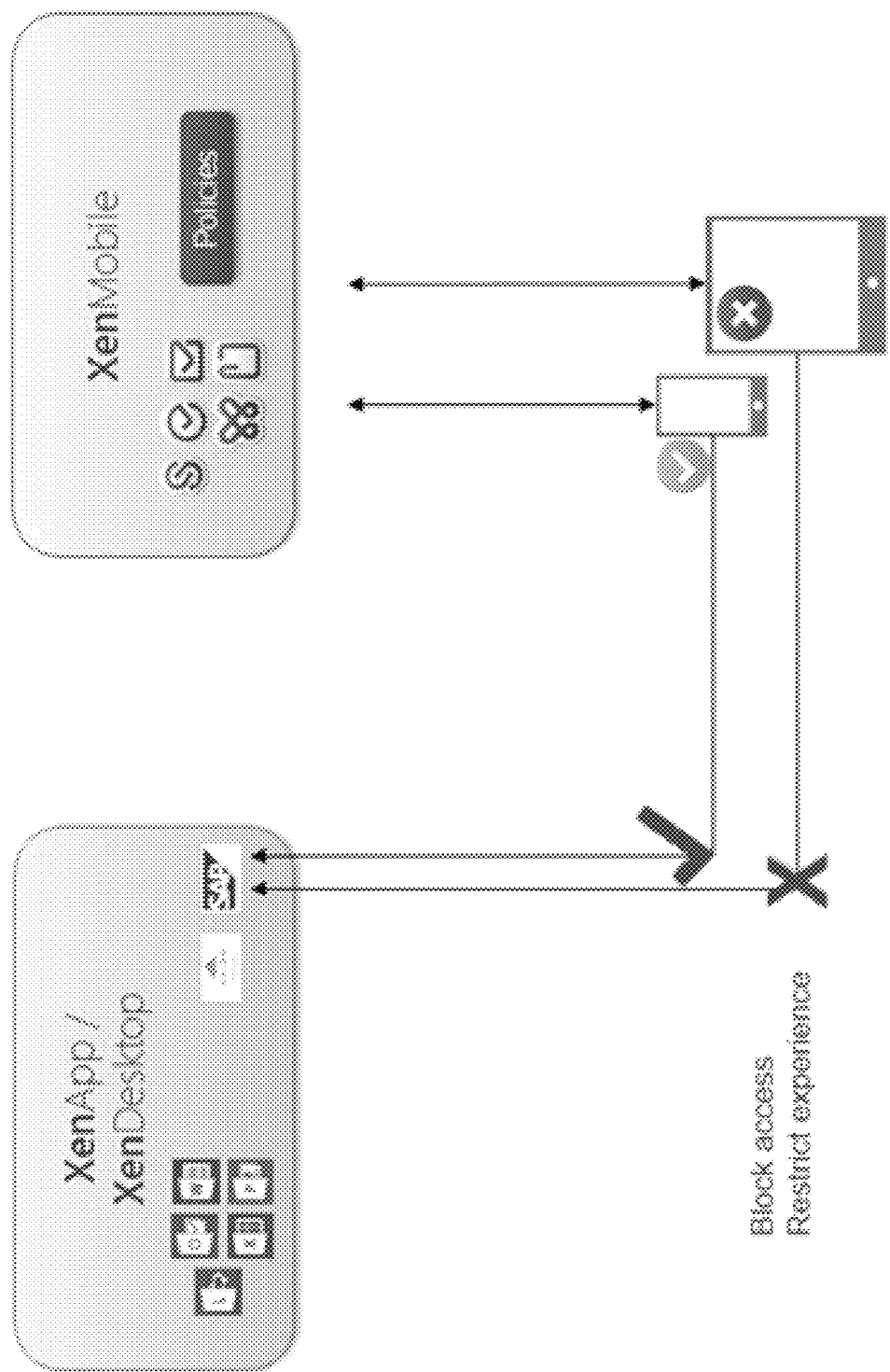

FIG. 8 illustrates an example in which a single compliance tag is received from CITRIX XenMobile and in which access is blocked and experience in an HDX hosted application (which may, e.g., be provided to one or more mobile devices via CITRIX XenApp and/or CITRIX XenDesktop) is restricted in accordance with one or more aspects of the disclosure.

Figure 9:
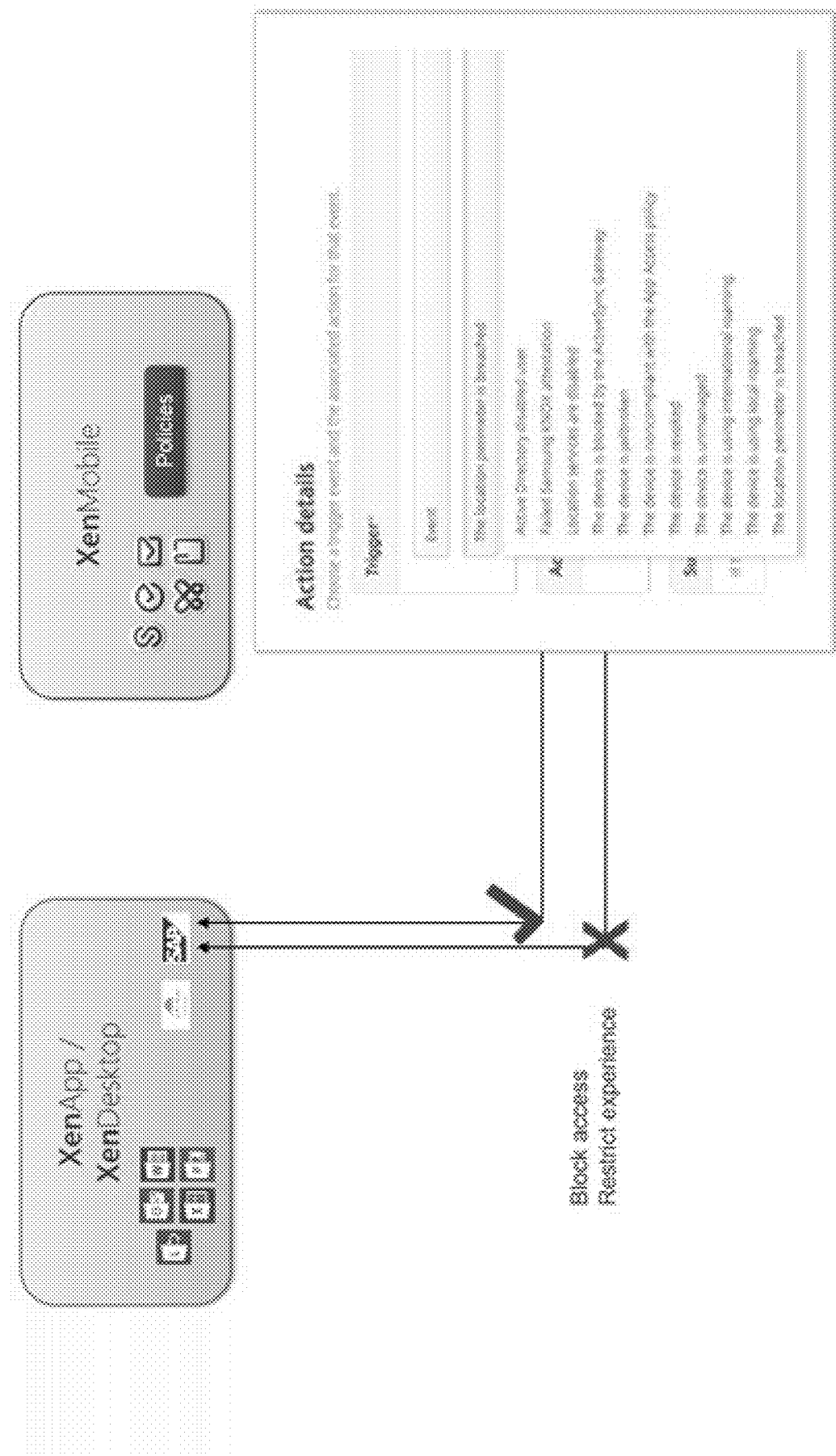

FIG. 9 illustrates an example in which a single compliance tag is received from CITRIX XenMobile and in which a trigger event is selected in CITRIX XenMobile in accordance with one or more aspects of the disclosure.

Figure 10:
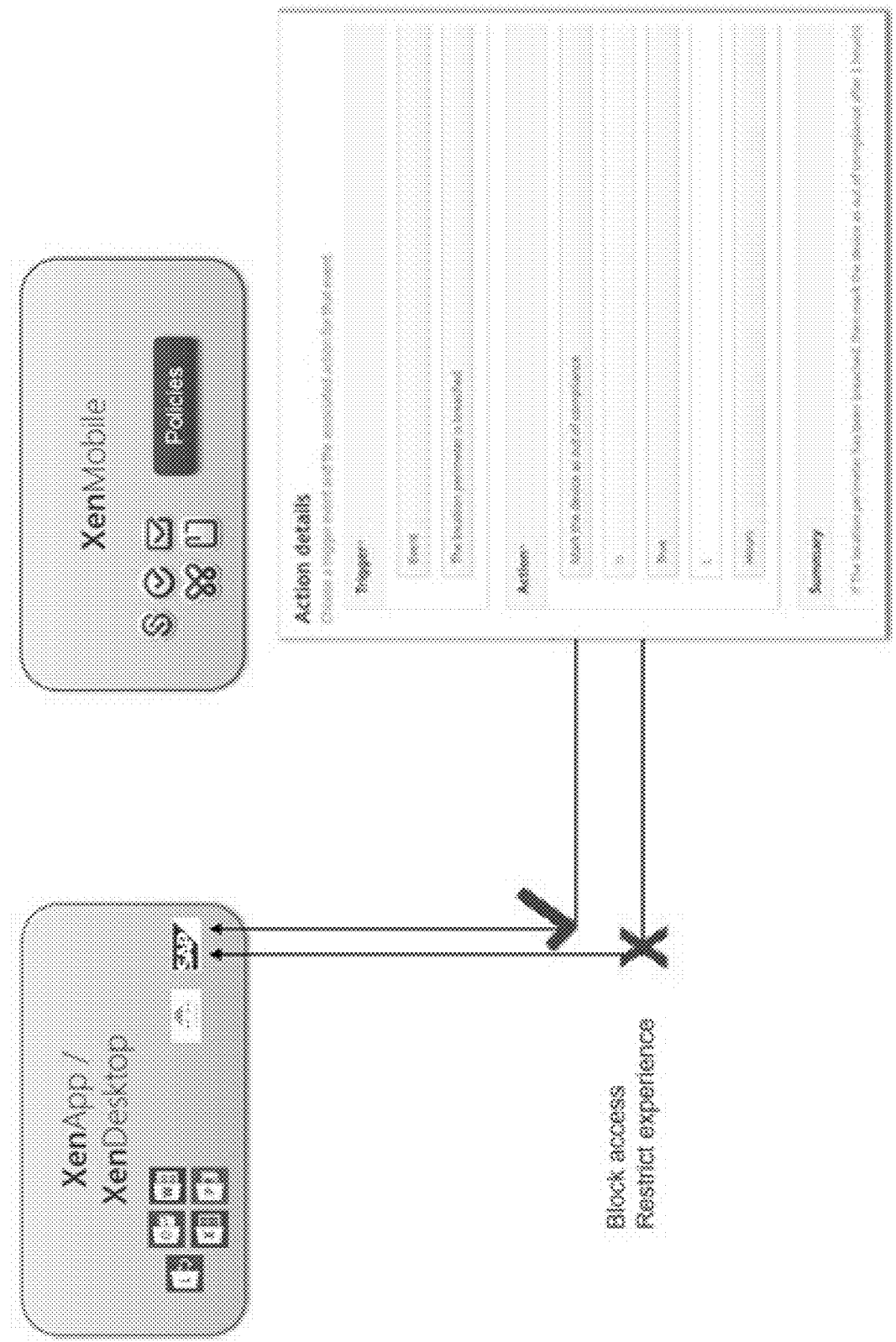

FIG. 10 illustrates an example in which a single compliance tag is received from CITRIX XenMobile and in which an action is selected in CITRIX XenMobile in accordance with one or more aspects of the disclosure.

Figure 11:
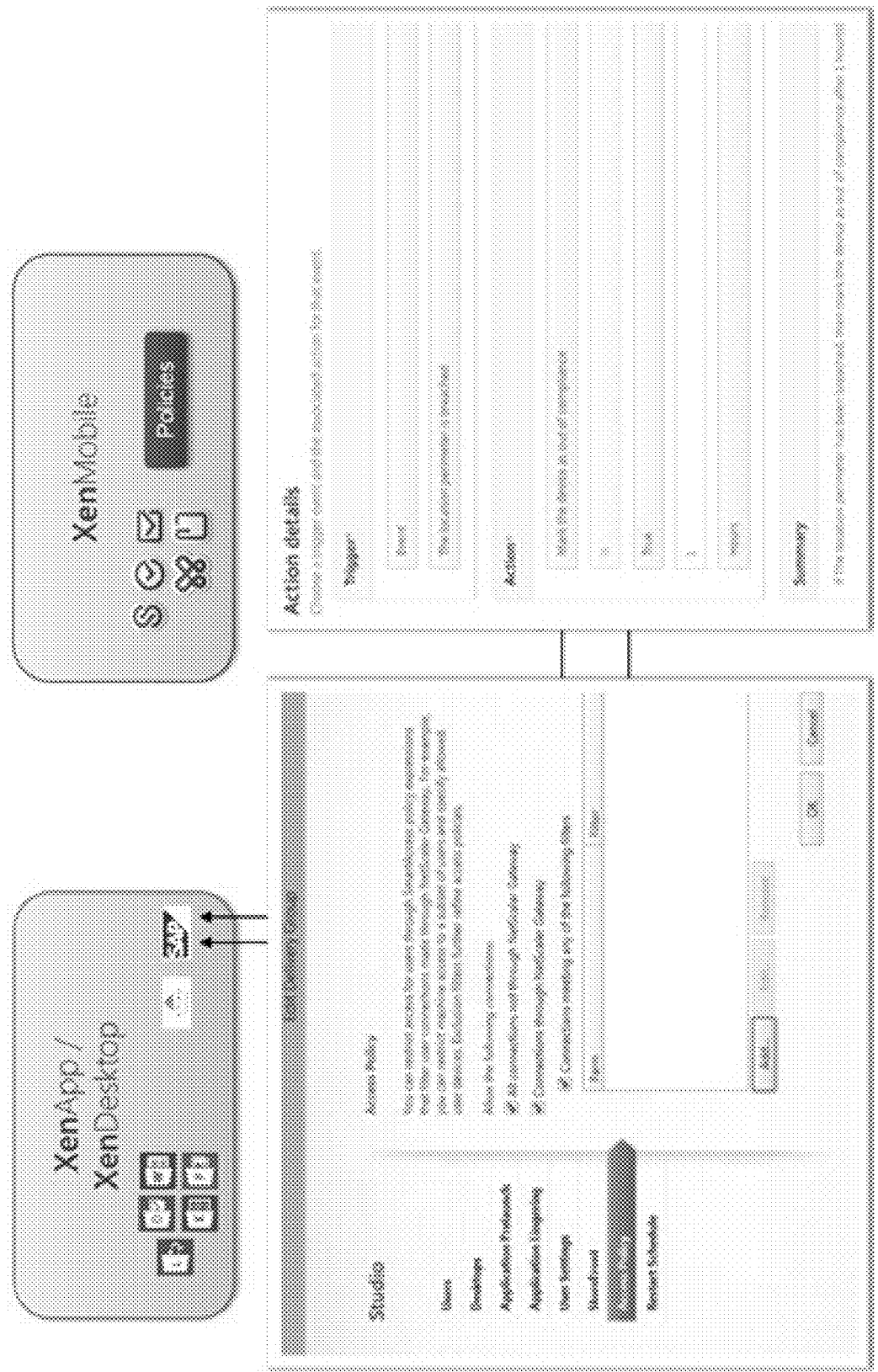

FIG. 11 illustrates an example in which a single compliance tag is received from CITRIX XenMobile and in which a Smart Access policy is set in CITRIX XenApp and/or CITRIX XenDesktop based on the single compliance tag received from CITRIX XenMobile in accordance with one or more aspects of the disclosure.

Figure 12:
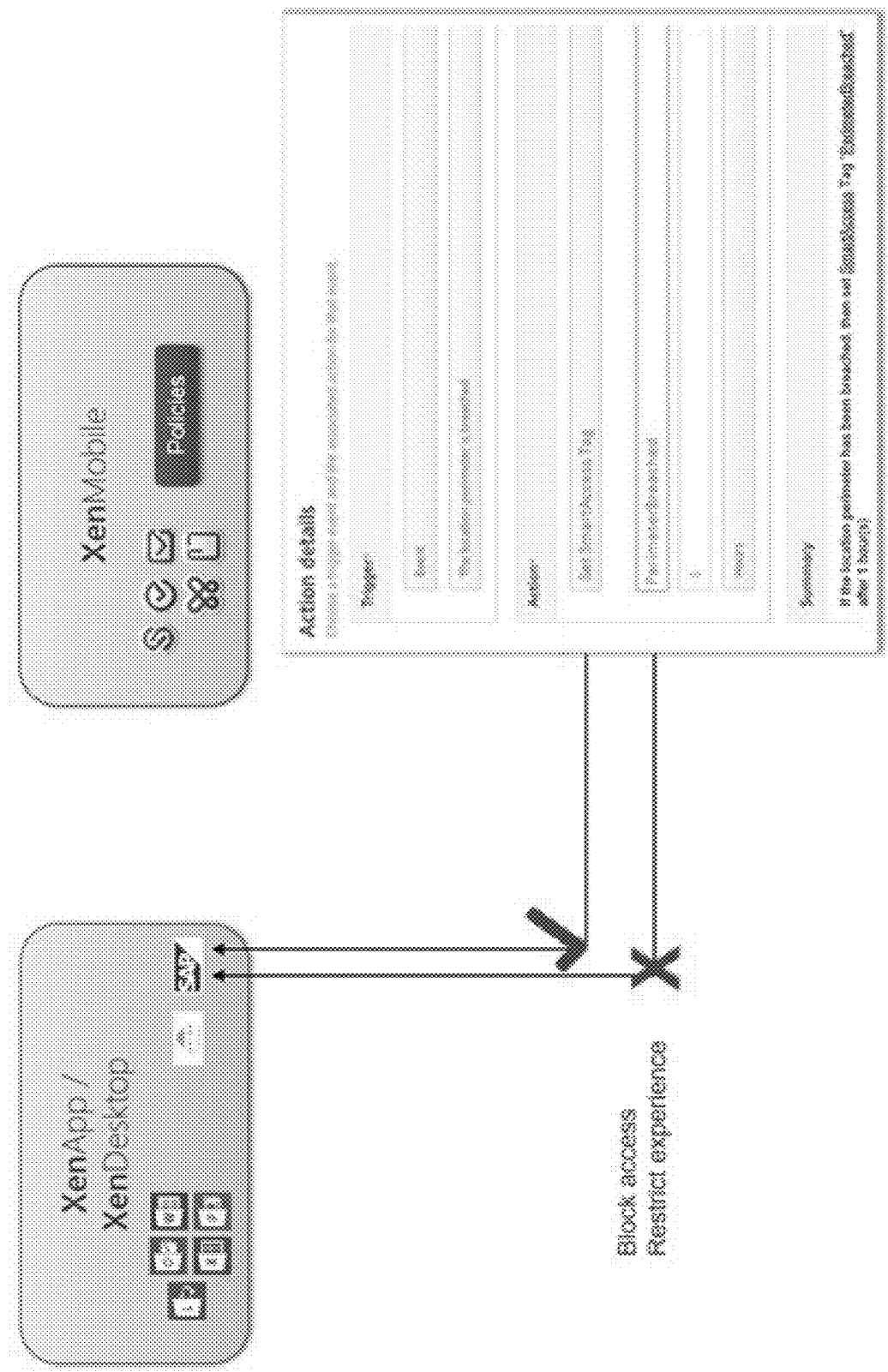

FIG. 12 illustrates an example in which one or more custom compliance tags are received from CITRIX XenMobile in accordance with one or more aspects of the disclosure.

Figure 13:
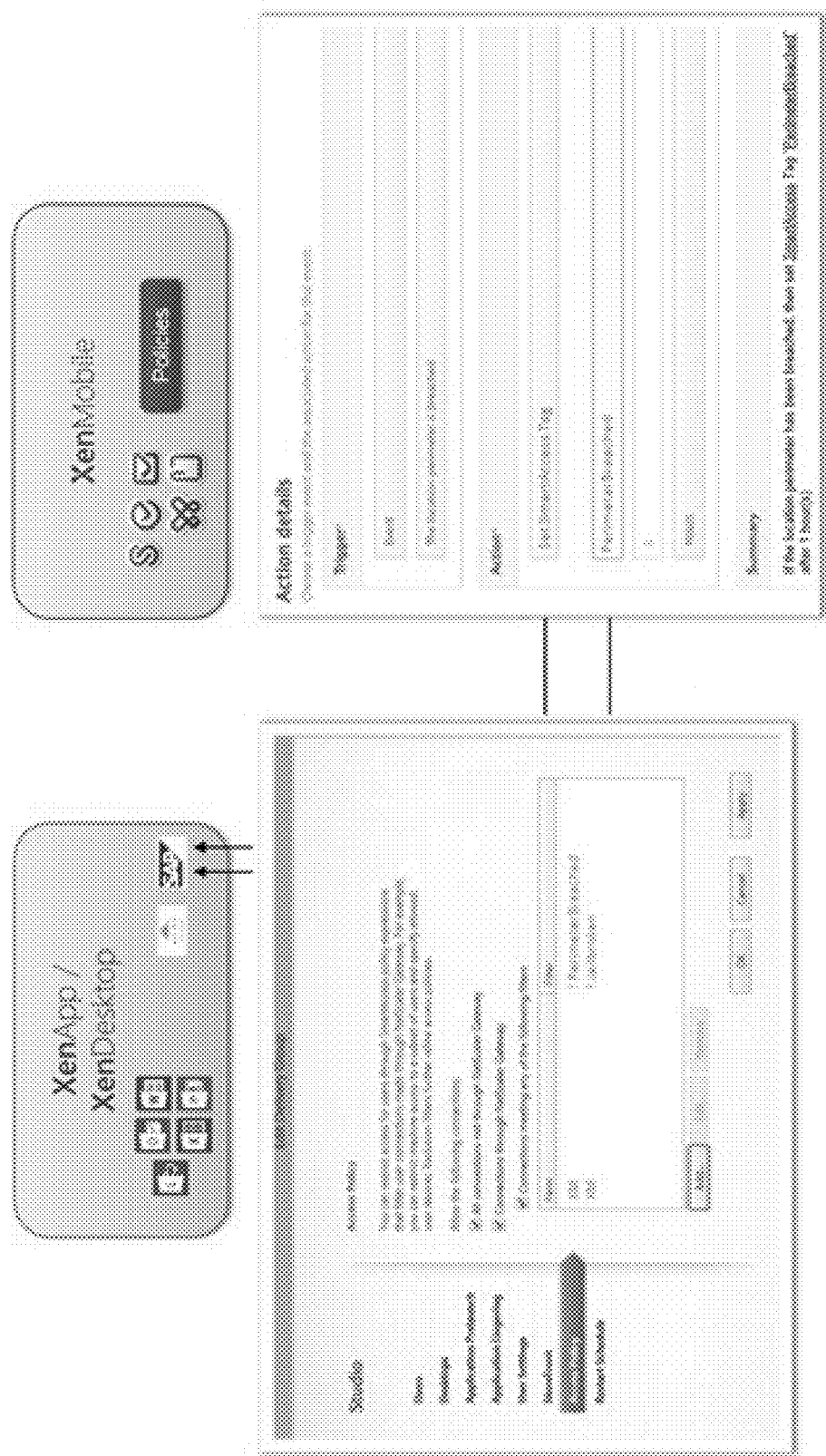

FIG. 13 illustrates an example in which a Smart Access policy is set in CITRIX XenApp and/or CITRIX XenDesktop based on one or more custom compliance tags received from CITRIX XenMobile.

One or more deployment options may be used when implementing one or more aspects of the disclosure. For example, one or more aspects of the disclosure may be deployed using MDM functionality only, MAM functionality only, or MDM functionality and MAM functionality. In some instances, CITRIX WorxHome may be used in providing both MDM functions and/or MAM functions, as well as in providing HDX hosted application functions (e.g., using CITRIX XenMobile Server Aggregated Store). For example, HDX functionality may be embedded in CITRIX WorxHome, or CITRIX Receiver may be used as an HDX player application only. In other instances, CITRIX WorxHome may be used only for MDM functionality and/or MAM functionality. In these instances, CITRIX Receiver may be used for HDX functionality (which may, e.g., involve using a separate HDX store and HDX player application)

One or more technical options may be used when implementing one or more aspects of the disclosure. For example, in one technical option, CITRIX WorxHome may be used with CITRIX XenMobile Aggregated Store. In instances in which this technical option is used, CITRIX XenMobile Server may send compliance tag(s) to a CITRIX StoreFront Server.

In another technical option, two mobile applications may be used. For example, CITRIX WorxHome may be used for enrollment, for providing MDM functionality and/or MAM functionality, and for providing a mobile application store and/or native application store. In addition, CITRIX Receiver may be used for providing an HDX store and an HDX player. In instances in which this technical option is used, certain information may be shared between the applications. For example, device identifier (ID) information may be shared (which may, e.g., represent a preferred configuration) or one or more actual compliance tags may be shared (which may, e.g., represent a more simple and practical option, but might be less secure without additional security measures being used). In instances in which only MDM functionality is used, the MDM application property may be set to share values. In instances in which only MAM functionality is used, MDX vault interfaces, shared secret vault (SSV) vault interfaces, or another custom application programming interface (API) may be used to share values. In some instances, an Enhanced Delivery Services protocol may be used for sharing and/or otherwise communicating device ID information and/or compliance tags between CITRIX Receiver and a StoreFront Server and/or between CITRIX WorxHome and a XenMobile Server. In some instances, a XenMobile Server may send the device ID information and/or the one or more compliance tags to a StoreFront Server (which may, e.g., represent a preferred configuration).

In another technical option, an administrative user interface may be used. For example, a CITRIX XenMobile Server Admin Console user interface may be used to define one or more compliance tags for use in CITRIX StoreFront and XenApp and/or XenDesktop. One or more updates may be made to CITRIX XenApp and/or XenDesktop Studio UI to use CITRIX XenMobile Server MDM and/or MAM compliance tags for desktop and/or application filtering, as well as for session policies.

In one or more arrangements, the end point analysis (EPA) data received from MAM services and/or MDM services may provide information on a particular mobile device being used. Such information may, for instance, indicate whether the mobile device has been jailbroken, include information associated with geofencing, include information identifying a device model, include information identifying an operating system version, include information indicating whether a particular application is installed, include information indicating whether a user has disabled certain functions or features, include information identifying a carrier network associated with the mobile device, include information identifying a country code associated with the mobile device, and/or include other information.

In some instances, an XMS administrator may configure automated actions in XMS to set one or more specific compliance tags based upon asset inventory, device properties, events, and/or other factors. For example, if the device is not in a specified latitude and/or longitude range, a specific compliance tag may be set to "PerimiterBreached." Additionally or alternatively, if the device's operating system is lower than version 8.x, a specific compliance tag may be set to "LegacyMobileOS." Additionally or alternatively, if the device has been jailbroken, a specific compliance tag may be set to "Jailbroken." Additionally or alternatively, if the device is in a specified latitude and/or longitude range, a specific compliance tag may be set to "RemoteAccess."

An XA/XD admin may then configure one or more Smart Access policies. For example, user access to certain applications or desktops may be restricted based on XenMobile tags. For instance, user access to certain applications or desktops may be restricted based on XenMobile tags indicating that the user's device has a status of "Jailbroken" or "PerimiterBreached."

As another example, one or more HDX Session policies may be applied for one or more users. For instance, HDX Client Drive Mapping may be disabled based on a tag indicating that the user's device has a status of "Jailbroken." As an another example, a "Framehawk" HDX graphics mode (which may, e.g., provide excellent HDX session interactivity over WANs (which may, e.g., have high latency and packet loss) at the expense of bandwidth use and XA/XD server scalability (e.g., at the expense of CPU and memory)) may be enabled based on XenMobile tags. For instance, such a "Framehawk" HDX graphics mode may be enabled based on XenMobile tags indicating that the user's device has a status of "RemoteAccess." Otherwise, the HDX session provided on the device may use the default Thinwire HDX graphics mode which uses little bandwidth and favors XA/XD server scalability (which may, e.g., maximize a number of users on a box). In some arrangements, MAM EPA may be more limited in scope than MDM EPA.

One or more deployment options may be used in implementing one or more aspects of the disclosure. Some example deployment options are discussed in greater detail below.

Deployment #1: Unified Client (WorxHome) with XenMobile Server-Aggregated Store

Figure 14:
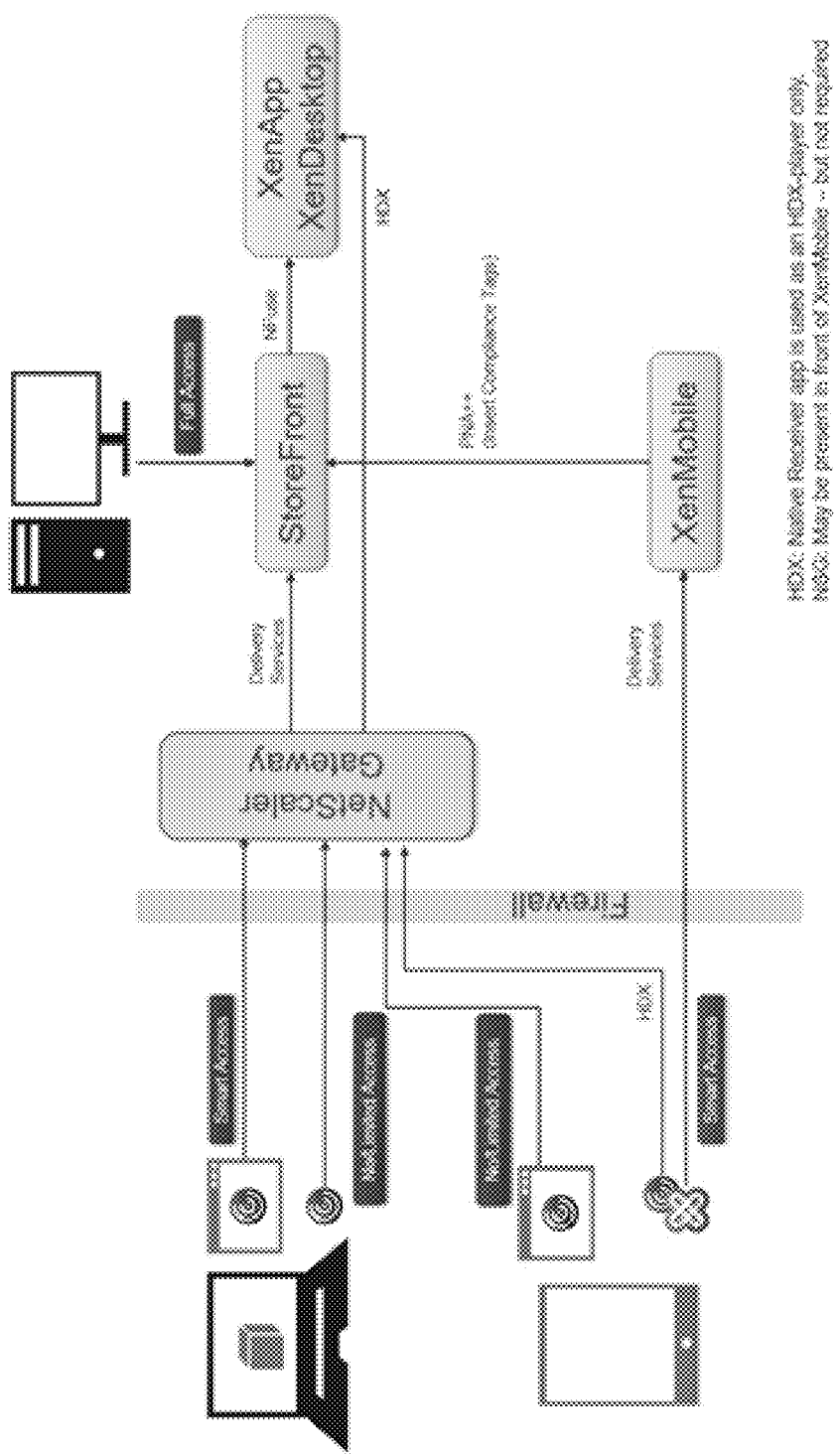

In some instances, aspects of the disclosure may be implemented in the manner shown in FIG. 14, which represents Deployment 1. Such a deployment may be used when CITRIX WorxHome provides a unified store and launch support for applications. In this deployment, a Receiver application may be used to actually establish an HDX connection. In alternative arrangements, an HDX Engine embedded in WorxHome may be used to establish an HDX connection.

In the deployment and configuration illustrated in FIG. 14, XenMobile Server may be configured to aggregate HDX-applications from StoreFront server. In addition, NetScaler Gateway may be configured with EPA. The session policies may be configured to perform an EPA scan when a User-agent indicates a browser on a WINDOWS or MAC OS X laptop or desktop computer. For other clients (e.g., browsers on mobile devices or native Receivers), NetScaler Gateway may skip the EPA, in which case access to sensitive HDX applications that require EPA tags might not be available from such clients, for example.

Furthermore, in the deployment and configuration illustrated in FIG. 14, published applications and session policies in XenApp and/or XenDesktop may be configured appropriately for smart access (e.g., application availability or session experience may be restricted based on EPA). In addition, XenMobile Automated Actions may be configured to mark a device as out-of-compliance based on certain triggers (e.g., user triggers, device triggers, application triggers, etc.).

In the deployment and configuration illustrated in FIG. 14, an example runtime sequence of operations may occur as follows. First, WorxHome may request enumeration of applications from XenMobile. Second, when making the enumeration request to StoreFront, XenMobile may inject the device-compliance tags into the Program Neighborhood Agent (PNA) protocol request (e.g., as an HTTP header). These tags may be signed using a signing certificate on the XenMobile server. Third, StoreFront may validate the signature of these tags and relay the tags to XA/XD over an NFuse protocol enumeration request. Fourth, XA/XD may filter out the applications based on the provided user-context and tag, and the application details may be sent back to WH (e.g., via StoreFront and XenMobile).

Fifth, when a user launches the application, the launch request may be sent to XA/XD via the same path (e.g., WH→XenMobile→StoreFront→XA/XD). The compliance tags may be inserted by XenMobile before making PNA launch requests to StoreFront. If the launch is permitted, the launch information (which may, e.g., be embodied in an ICA file) may be sent to WH. Sixth, XA/XD may save the tags along with the logon ticket to be used when the remote HDX session (which may, e.g., be a remote HDX WINDOWS session) is created. During remote HDX session start (which may, e.g., be a remote HDX WINDOWS session start), the tags may be used to determine applicable Session Policies.

Deployment #2: Separate WorxHome and Receiver Clients Each With Their Own Store

Figure 15:
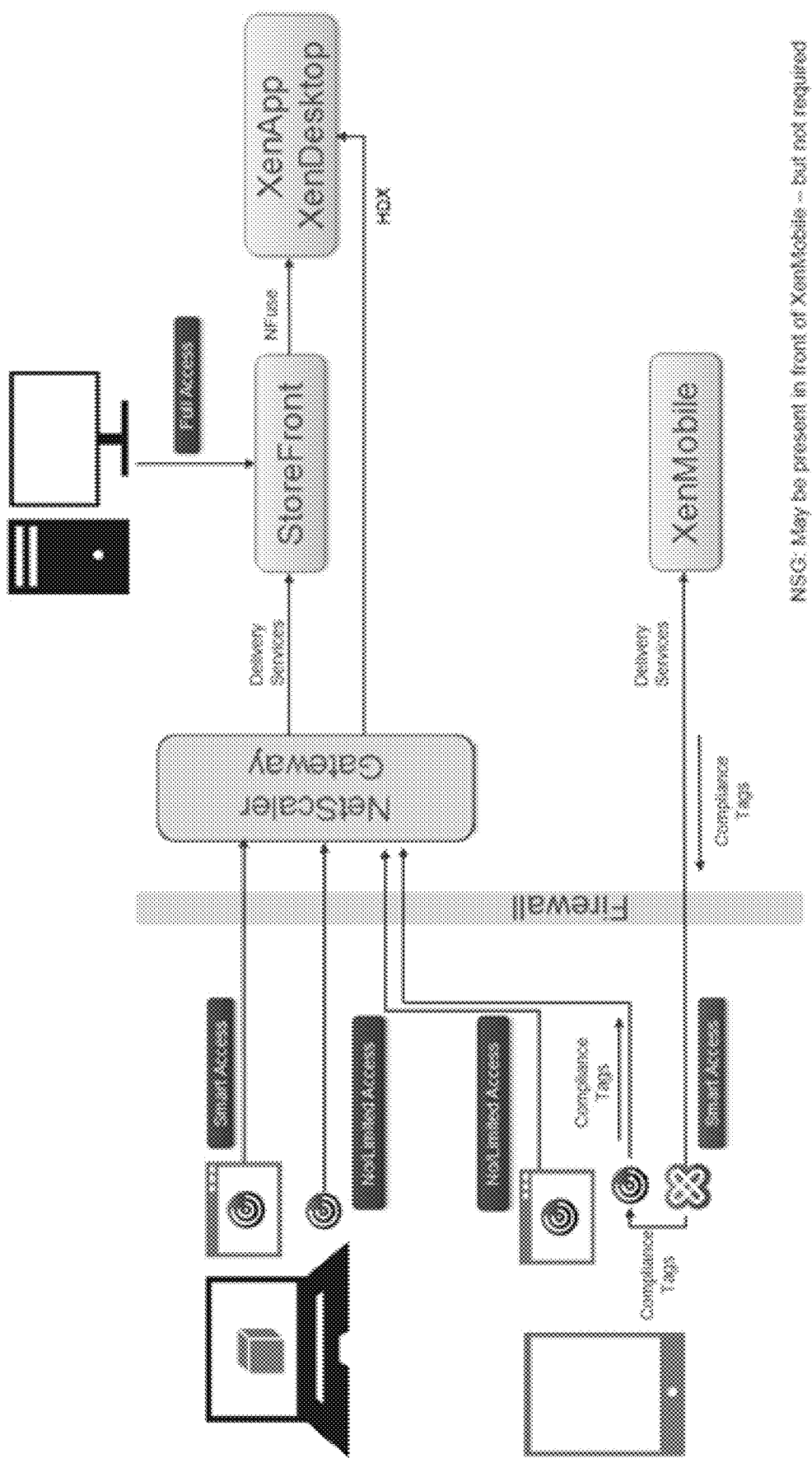

In some instances, aspects of the disclosure may be implemented in the manner shown in FIG. 15, which represents Deployment 2. Such a deployment may be used when CITRIX WorxHome is used only as an MAM/MDM enrollment agent and a store for mobile applications. In these instances, Receiver may be used as the store and player for HDX applications. In addition, compliance tags may be exchanged directly between client applications.

In an alternative arrangement of this deployment, Receiver may be the store for mobile apps as well. In other words, in this alternative arrangement, Receiver may contain a client-aggregated store for both mobile applications and HDX applications and talk to both XenMobile and StoreFront servers respectively. In this alternative arrangements, compliance Tags may still have to be transferred between WorxHome, as a MAM/MDM enrollment agent, and Receiver.

In the deployment and configuration illustrated in FIG. 15, XenMobile Server might not be configured to aggregate HDX-applications from StoreFront server. NetScaler Gateway may be configured with EPA. The session policies may be configured to perform an EPA scan when the User-agent indicates a browser on a WINDOWS or MAC OS X laptop or desktop computer. For other clients (e.g., browsers on mobile devices or native Receivers), NetScaler Gateway may skip the EPA, in which case access to sensitive HDX applications that require EPA tags might not be available from such clients, for example.

Furthermore, in the deployment and configuration illustrated in FIG. 15, published applications and session policies in XenApp and/or XenDesktop may be configured appropriately for smart access (e.g., application availability or session experience may be restricted based on EPA). In addition, XenMobile Automated Actions may be configured to mark a device as out-of-compliance based on certain triggers (e.g., user triggers, device triggers, application triggers, etc.).

In the deployment and configuration illustrated in FIG. 15, the administrator might need to perform one or both of the following configurations on XenMobile. First, for devices that will be MDM-enrolled, an app-property might be required to be configured for the Receiver native application to push the compliance state to the device. The format of this property is to be determined (e.g., one long property or multiple properties). Additionally, this feature may be supported for MDM-only deployments as well, but might require using the wrapped and/or managed Receiver (e.g., Receiver-for-XM application). Second, for devices that will not be MDM-enrolled, the administrator might be required to publish a wrapped and/or managed Receiver application as a XenMobile managed application.

In the deployment and configuration illustrated in FIG. 15, an example runtime sequence of operations may occur as follows. First, Receiver may be installed on a mobile device (either via MDM or via MAM). Second, XenMobile may determine the device-compliance state of the device and make this information available to the mobile device using one of the following mechanisms: (1) App-property push via MDM; or (2) WH querying XM for device-compliance state and saving it in the MDX vault. The compliance state may consist of [tags, timestamp, and a signature]. The timestamp and the signature may be used to prevent replay attacks and forgery attacks respectively. The signature may be created using the private key of a certificate installed on XMS server.

Third, Receiver may check whether an app-property indicating the compliance state is present. If not, Receiver may look in the MDX vault (if present) to check for the compliance state. When making the enumeration request to StoreFront, Receiver may include the device-compliance tags in the Delivery Services request.

Fourth, StoreFront may validate the signature using the public key of a certificate that is installed on it (e.g., corresponding to the private key present on the XM server). StoreFront may then relay these tags to XA/XD over an NFuse enumeration request. Fifth, XA/XD may filter out the applications based on the provided user-context and tags, and the application details may be sent back to Receiver via StoreFront. Sixth, when a user launches the application, the launch request may be sent to XA/XD via the same path (e.g., Receiver→StoreFront→XA/XD). The compliance tags may be inserted by Receiver before making Delivery Services launch requests to StoreFront. If the launch is permitted, the launch information (which may, e.g., be embodied in an ICA file) may be sent to Receiver. Seventh, XA/XD may save the tags along with the logon ticket to be used when the remote HDX session (which may, e.g., be a remote HDX WINDOWS session) is created. During remote HDX session start (which may, e.g., be a remote HDX WINDOWS session start), the tags may be used to determine applicable Session Policies.

Alternative Design to Deployment #2: XenMobile Server Provides Device ID and Compliance Tags to StoreFront Server In some instances, aspects of the disclosure may be implemented in the manner shown in FIG. 16, which represents a more advanced design that can be applied in the same Deployment 2 discussed above. In this alternative design, WorxHome and Receiver may share a Device ID and communicate it to XenMobile Server and StoreFront Server respectively. XenMobile Server then may provide the Device ID along with the compliance tags to StoreFront Server. Thus the compliance tags may be shared via the server backend and may be associated with a certain Receiver instance based on the matching Device ID.

This design has several benefits. For example, one benefit is security, since the compliance tags might not be exchanged directly with the mobile device, thus reducing potential attack surface. Another benefit is simplicity in client and protocol implementation, since only a device ID might be exchanged with the servers. However, there may be added complexity in setting up communication of the Device ID and the compliance tags from the XenMobile Server to the StoreFront Server.

Figure 16:
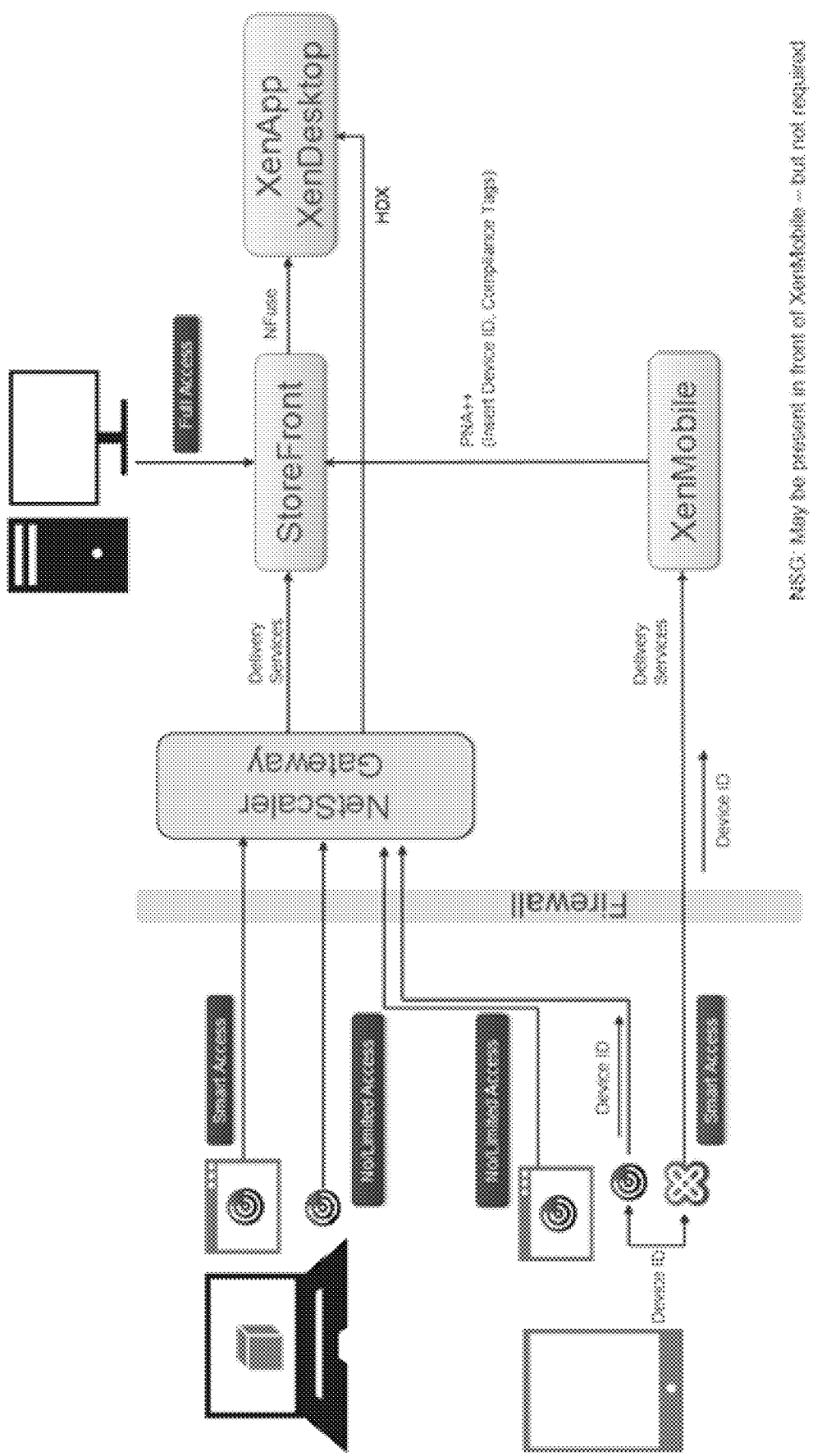

As seen in FIG. 16, separate WorxHome and Receiver client applications each with their own store may be provided. The Device ID may be shared between client applications. In addition, XenMobile Server may provide the Device ID and Compliance Tags to StoreFront Server.

In the deployment and configuration illustrated in FIG. 16, an example runtime sequence of operations may occur as follows. First, both WorxHome and Receiver may obtain a unique device ID, such as a MAC address or an autonomously generated persistent secret shared between the two apps. In an MAM only mode, the unique device ID may be obtained via the MDX vault or Shared Secret Vault (SSV) or another API. In an MDM only mode, the unique device ID may be generated by either WH or XMS and exchanged. Then it may be pushed to Receiver via an MDM property. In an MDM+MAM mode, either of these mechanisms above may be used.

Second, both applications may communicate the unique Device ID to the server. For example, WH may communicate to XMS to extend the existing Delivery Services protocol (e.g., WH to XMS). In addition, Receiver may communicate to SF to extend the existing Delivery Services protocol (e.g., Receiver to SF).

Third, SF may query Compliance Tags from XMS based on Device ID. For example, SF may call into XMS to check if the Device ID belongs to the user that has authenticated to SF, and may obtain the compliance tags. This might require an authenticated connector to be built between XMS and SF. The XenMobile Device Manager's REST Web Services APIs may be leveraged to extract Device ID data. Alternatively, a new API may be built for SF to query into XMS. The API may be secured based on public/private key cryptography.

Fourth, SF may assign and/or apply compliance tags to Receiver's HDX app enumeration and launch requests. It then may relay these tags to XA/XD over NFuse enumeration request. Fifth, XA/XD may filter out the applications based on the provided user-context and tags, and the application details may be sent back to Receiver via StoreFront.

Sixth, when a user launches the application, the launch request may be sent to XA/XD via the same path (e.g., Receiver→StoreFront→XA/XD). The compliance tags may be inserted by Receiver before making Delivery Services launch requests to StoreFront. If the launch is permitted, the launch information (which may, e.g., be embodied in an ICA file) may be sent to Receiver.

Seventh, XA/XD may save the tags along with the logon ticket to be used when the remote HDX session (which may, e.g., be a remote HDX WINDOWS session) is created. During remote HDX session start (which may, e.g., be a remote HDX WINDOWS session start), the tags may be used to determine applicable Session Policies.

In implementing one or more aspects of the disclosure, one or more technical options included in the following tables may be utilized.

TABLE A

Configuration and Management

| Component | Configuration Requirements |
|---|---|
| Desktop Studio | Desktop Studio might need to provide a user interface to configure XM tags as part of Published applications and/or desktops and Session Policies. The current user interface is more geared towards NetScaler-based Smart-access. Cosmetic changes might be needed to configure XM-based Smart-Access. |
| StoreFront | StoreFront might need to provide support for uploading a public certificate (e.g., via console or PowerShell SDK) that can be used for verifying the authenticity of assertions provided by XM. This might only be needed for Deployment #2. |
| XM Console | For MDM-enrolled devices: May provide configuration for setting application properties for Receiver app. |

TABLE B

Updates to Product Components

| Component | Impact |
|---|---|
| XenMobile | UI + Server: Ability to generate and export or upload a signing certificate for SmartAccess tags. (Deployment #1 and #2) Server: Relay signed assertions about device compliance state over PNA to StoreFront (Deployment #1) Server: Provide an API for WH to retrieve signed assertions for non-MDM-enrolled devices (Deployment #2) Server: Support device-compliance-state for MAM-only devices as well. UI: Configuration of app-properties for Receiver (e.g., via MDM) for MDM-enrolled-devices (Deployment #2) |
| XenDesktop | Desktop Studio: Cosmetic changes to allow configuration of XM Smart-access tags (Both deployments) DDC: Might not need any changes to process XM Smart-access tags or may treat these as NSG Smart-access tags (e.g., even if connection may not be via NSG) (Both deployments) |
| StoreFront | Relay tags received over PNA to DDC (Deployment #1) Relay tags received over Delivery Services to DDC (Deployment #2) Configuration for public certificate may be used for validating authenticity of smart-access assertions (Deployment #2) |
| Receiver | Read compliance-state as app-properties pushed via MDM (Deployment #2) Get compliance state from MDX vault (Deployment #2) Provide compliance state to StoreFront over Delivery Services (Deployment #2) |
| WorxHome | Retrieve compliance state from server and save in MDX vault (Deployment #2) On Android, retrieve compliance state from server and make it available as app configuration for Receiver |
| MDX | Applies to Deployment 2. For iOS, updates might not be required to share compliance tags between WH and Receiver if the MDX vault is used. But such sharing may be limited to apps signed with same profile, since it is based on the iOS |

TABLE B-continued

Updates to Product Components

| Component | Impact |
|---|---|
| | protected keychain. If SSV is used instead, then minor updates might need to be made to include the compliance tags in SSV vault database. SSV may also work with apps that may be signed with different profile. For Android the Communication between WH and Receiver may be based on workflows and secured with certificates. For Windows Mobile (Universal Windows Platform) the Communication between WH and Receiver may be based on App Services and secured based on App Package Family. |

Aspects of the disclosure may be applied to selectively restricting access to or features of web applications, network and/or cloud-based resources. Additionally or alternatively, aspects of the disclosure may be used in any products involving client-server or direct client-client communication, such as Citrix XenApp/XenDesktop, Citrix Secure Browser Service, ShareFile, and/or GoTo Products, for example.

Figure 17:
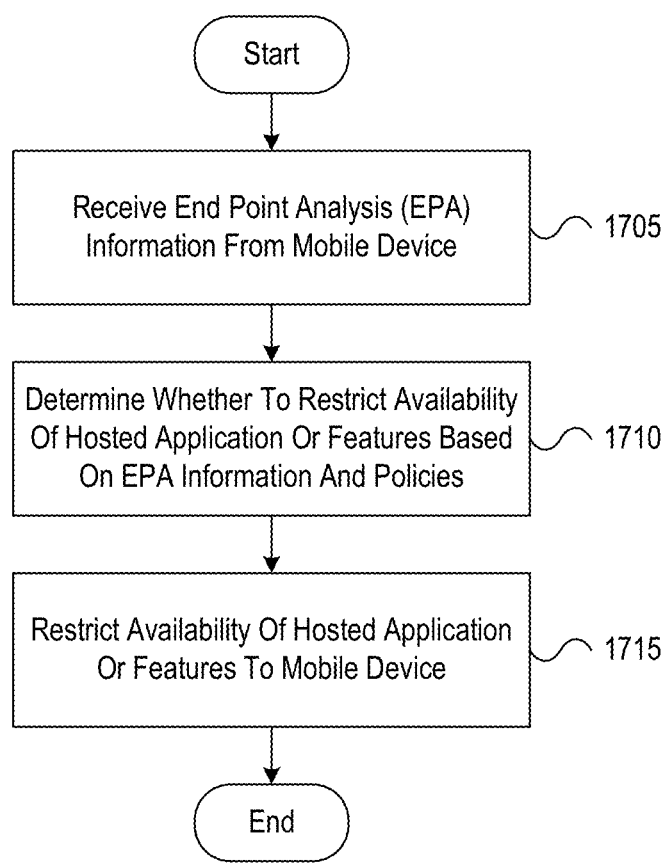
FIG. 17 depicts a method of providing mobile devices with smart access to hosted applications in accordance with one or more illustrative aspects described herein.

FIG. 17 depicts a method of providing mobile devices with smart access to hosted applications in accordance with one or more illustrative aspects described herein. In some embodiments, the method illustrated in FIG. 17 may be performed by a computing platform that incorporates, utilizes and/or includes one or more elements of the computer system architecture, remote-access system architecture, virtualized (hypervisor) system architecture, cloud-based system architecture, and/or enterprise mobility management systems discussed above in connection with FIGS. 1-6. For example, the method illustrated in FIG. 17 may be executed by a computing platform having at least one processor, a memory, and a communication interface. At step 1705, the computing platform may receive, via the communication interface, end point analysis information from a mobile device. At step 1710, the computing platform may determine, based on one or more smart access policies and the end point analysis information received from the mobile device, whether to restrict availability of a hosted high definition experience (HDX) application or one or more specific HDX session features to the mobile device. At step 1715, based on determining to restrict the availability of the hosted HDX application or the one or more specific HDX session features to the mobile device, the computing platform may restrict the availability of the hosted HDX application or the one or more specific HDX session features to the mobile device.

Figure 18:
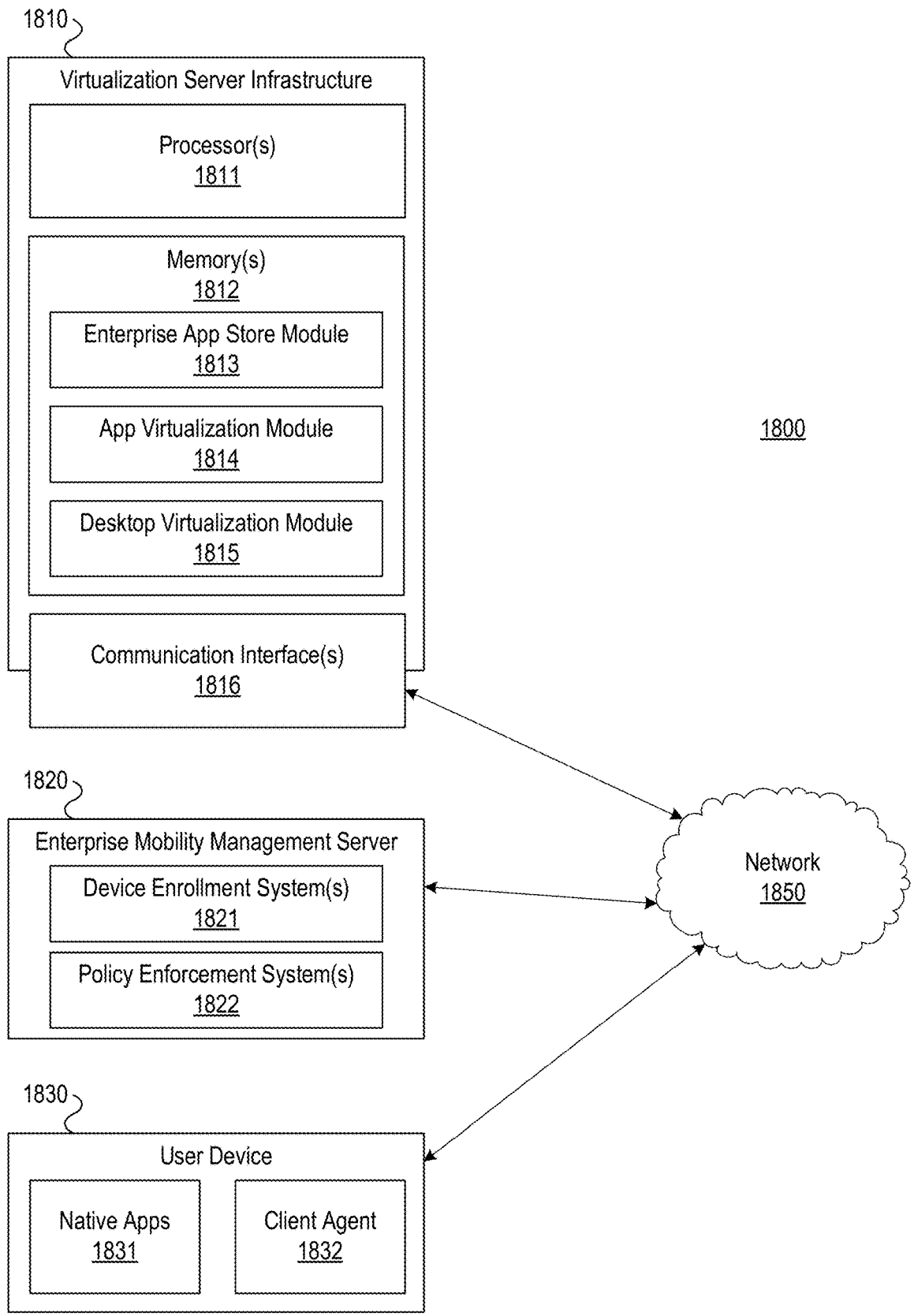
FIG. 18 depicts an illustrative computing environment for providing an enrolled device with smart access to hosted applications in accordance with one or more illustrative aspects described herein.

FIG. 18 depicts an illustrative computing environment for providing an enrolled device with smart access to hosted applications in accordance with one or more illustrative aspects described herein. Referring to FIG. 18, computing environment 1800 may include virtualization server infrastructure 1810, an enterprise mobility management server 1820, a user device 1830, and a network 1850. Virtualization server infrastructure 1810, enterprise mobility management server 1820, and user device 1830 may include one or more physical components, such as one or more processors, memories, communication interfaces, and/or the like. In addition, virtualization server infrastructure 1810 may include, incorporate, and/or implement one or more aspects of the virtualization servers and/or other virtualization infrastructure discussed above. Enterprise mobility management server 1820 may include, incorporate, and/or implement one or more aspects of the enterprise systems and/or management servers discussed above. User device 1830 may include, incorporate, and/or implement one or more aspects of the client devices, mobile devices, and/or user devices discussed above.

For example, virtualization server infrastructure 1810 may include at least one processor 1811, at least one memory 1812, and at least one communication interface 1816. Processor 1811 may execute instructions stored in memory 1812 to cause virtualization server infrastructure 1810 to perform one or more functions, such as executing an operating system and/or one or more applications, including one or more applications that may cause virtualization server infrastructure 1810 to provide an enterprise application store (e.g., to one or more enrolled devices and/or other devices associated with an enterprise), one or more virtualized and/or hosted application sessions, and/or one or more virtualized and/or hosted desktop sessions. Memory 1812 may store an enterprise application store module 1813 (which may, e.g., incorporate one or more aspects of and/or cause virtualization server infrastructure 1810 to provide functionality similar to CITRIX StoreFront in the examples discussed above). In addition, memory 1812 may store an application virtualization module 1814 (which may, e.g., incorporate one or more aspects of and/or cause virtualization server infrastructure 1810 to provide functionality similar to CITRIX XenApp in the examples discussed above). Memory 1812 also may store a desktop virtualization module 1815 (which may, e.g., incorporate one or more aspects of and/or cause virtualization server infrastructure 1810 to provide functionality similar to CITRIX XenDesktop in the examples discussed above). Communication interface 1816 may include one or more network interfaces via which virtualization server infrastructure 1810 can communicate with one or more other systems and/or devices in computing environment 1800, such as enterprise mobility management server 1820, user device 1830, and/or one or more other systems and/or devices.

Enterprise mobility management server 1820 may include and/or provide at least one device enrollment system 1821 and at least one policy enforcement system 1822. Device enrollment system 1821 may enable and/or cause enterprise mobility management server 1820 to enroll one or more user devices, such as user device 1830 and/or one or more other user devices, into one or more policy enforcement schemes (which may, e.g., be associated with an enterprise organization and implemented and/or managed by one or more administrators using enterprise mobility management server 1820). Policy enforcement system 1822 may enable and/or cause enterprise mobility management server 1820 to enforce one or more enterprise policies on one or more enrolled user devices, such as user device 1830 and/or one or more other user devices. The one or more enterprise policies that may be enforced on one or more enrolled user devices by policy enforcement system 1822 and enterprise mobility management server 1820 may include one or more mobile device management policies, mobile application management policies, mobile content management policies, and/or other enterprise policies may be defined, applied, enforced, updated, disabled, and/or otherwise controlled by policy enforcement system 1822 and/or enterprise mobility management server 1820 (e.g., with respect to one or more managed devices, including one or more enrolled user mobile devices).

User device 1830 may include and/or provide one or more native applications 1831 and a client agent 1832. The one or more native applications 1831 may include, incorporate, and/or implement one or more aspects of the native applications discussed above (e.g., native applications 610). In addition, client agent 1832 may include, incorporate, and/or implement one or more aspects of the client agent discussed above (e.g., client agent 604). Network 1850 may include one or more local area networks, wide area networks, public networks, private networks, and/or sub-networks and may interconnect virtualization server infrastructure 1810, enterprise mobility management server 1820, and user device 1830.

Figure 19A:
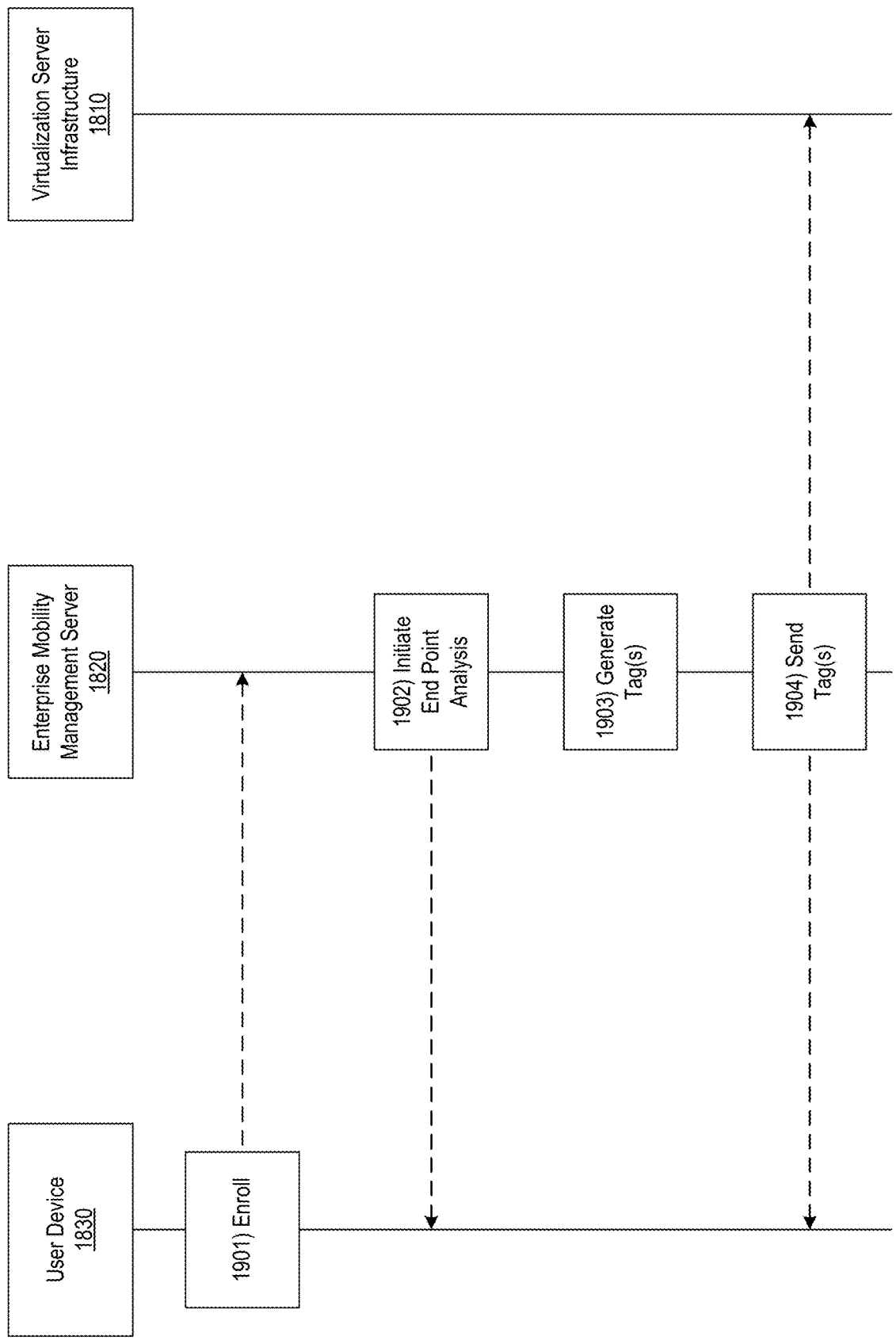
FIGS. 19A and 19B depict an example event sequence for providing an enrolled device with smart access to hosted applications in accordance with one or more illustrative aspects described herein.
Figure 19B:
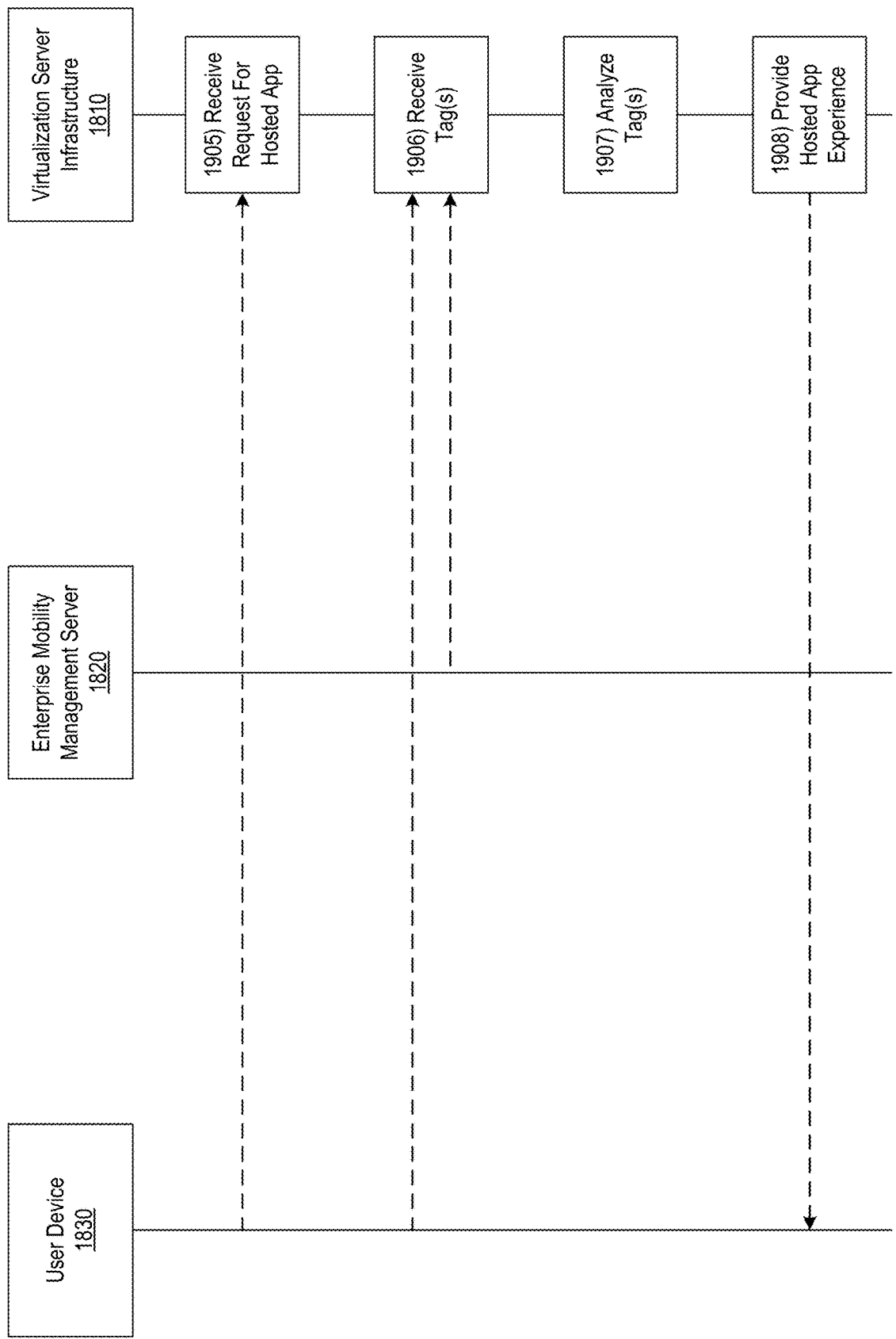

FIGS. 19A and 19B depict an example event sequence for providing an enrolled device with smart access to hosted applications in accordance with one or more illustrative aspects described herein. Referring to FIG. 19A, at step 1901, user device 1830 may enroll with enterprise mobility management server 1820. For example, at step 1901, user device 1830 may send, receive, and/or otherwise exchange data with enterprise mobility management server 1820 to enroll in an enterprise mobile device management, mobile application management, and/or other policy enforcement scheme that may be implemented by enterprise mobility management server 1820. In some instances, during enrollment of user device 1830, enterprise mobility management server 1820 may generate a unique device identifier for user device 1830 that may be stored and/or maintained by enterprise mobility management server 1820 and/or sent to one or more other systems and/or devices (e.g., user device 1830, virtualization server infrastructure 1810) to facilitate identifying user device 1830 in subsequent operations.

At step 1902, enterprise mobility management server 1820 may initiate an end point analysis of user device 1830. For example, enterprise mobility management server 1820 may request and/or query user device 1830 to provide state information that may be analyzed and/or otherwise evaluated by enterprise mobility management server 1820 to determine whether user device 1830 is in or out of compliance with one or more policies that may be enforced by enterprise mobility management server 1820. In some instances, enterprise mobility management server 1820 may perform a simple end point analysis (e.g., and determine simply that user device 1830 is entirely in or out of compliance with a set of policies applicable to user device 1830 and enforced on user device 1830 by enterprise mobility management server 1820, as discussed above), while in other instances, enterprise mobility management server 1820 may perform a rich end point analysis (e.g., and individually determine with respect to each policy included in a set of policies applicable to user device 1830 and enforced on user device 1830 by enterprise mobility management server 1820 that user device 1830 is in or out of compliance with each particular policy included in the set of policies, as discussed above).

At step 1903, enterprise mobility management server 1820 may generate one or more compliance tags for user device 1830 (e.g., based on initiating and/or performing an end point analysis of user device 1830 at step 1902). In some instances, the one or more compliance tags may indicate whether and/or that user device 1830 is in or out of compliance with a set of policies applicable to user device 1830 and enforced on user device 1830 by enterprise mobility management server 1820. In addition, the one or more compliance tags (which may, e.g., be generated for user device 1830 by enterprise mobility management server 1820) may, in some instances, be signed by enterprise mobility management server 1820 using a signing certificate of enterprise mobility management server 1820).

At step 1904, enterprise mobility management server 1820 may send the one or more compliance tags (e.g., the one or more compliance tags generated by enterprise mobility management server 1820 at step 1903) to one or more recipient systems and/or devices. In some instances, enterprise mobility management server 1820 may send the one or more compliance tags to the enrolled user device (e.g., user device 1830) as discussed above in connection with one or more of the example deployment models described above. Additionally or alternatively, enterprise mobility management server 1820 may send the one or more compliance tags to the virtualization infrastructure (e.g., virtualization server infrastructure 1810) as discussed above in connection with one or more of the other example deployment models described above.

Referring to FIG. 19B, at step 1905, virtualization server infrastructure 1810 may receive a request for a hosted application session, a hosted desktop session, or other hosted session from an enrolled user device (e.g., user device 1830). Such a request may be initiated using an enterprise portal client and/or receiver application executing on user device 1830 (e.g., CITRIX WorxHome, CITRIX Receiver, etc., as in the examples discussed above). Additionally or alternatively, such a request may be received via an enterprise application store provided by virtualization server infrastructure 1810 (e.g., CITRIX StoreFront, as in the examples discussed above).

At step 1906, virtualization server infrastructure 1810 may receive one or more compliance tags associated with the enrolled user device (e.g., user device 1830) requesting the hosted session and/or other end point analysis information associated with the enrolled user device (e.g., user device 1830) requesting the hosted session. For example, at step 1906, virtualization server infrastructure 1810 may receive, via the communication interface (e.g., communication interface 1816), end point analysis information associated with an enrolled device (e.g., user device 1830). In some instances, virtualization server infrastructure 1810 may receive the one or more compliance tags and/or other end point analysis information from the enrolled user device (e.g., user device 1830, as discussed above in connection with one or more of the example deployment models described above), while in other instances, virtualization server infrastructure 1810 may receive the one or more compliance tags and/or other end point analysis information from the enrolled user device from the enterprise management server (e.g., enterprise mobility management server 1820, as discussed above in connection with one or more of the other example deployment models described above). In instances in which virtualization server infrastructure 1810 receives the one or more compliance tags and/or other end point analysis information from the enrolled user device from enterprise mobility management server 1820, virtualization server infrastructure 1810 may correlate the received compliance tags and/or other end point analysis information with the particular enrolled device to which the received compliance tags and/or other end point analysis information relates (e.g., user device 1830) based on a unique identifier that may be assigned to the enrolled device (e.g., user device 1830) and received by virtualization server infrastructure 1810 along with the received compliance tags and/or other end point analysis information.

In some embodiments, receiving the end point analysis information associated with the enrolled device may include receiving the end point analysis information associated with the enrolled device from the enrolled device. For example, in receiving the end point analysis information associated with the enrolled device (e.g., user device 1830), virtualization server infrastructure 1810 may receive the end point analysis information associated with the enrolled device (e.g., user device 1830) from the enrolled device (e.g., user device 1830).

In some embodiments, receiving the end point analysis information associated with the enrolled device may include receiving the end point analysis information associated with the enrolled device from an enterprise mobility management server. For example, in receiving the end point analysis information associated with the enrolled device (e.g., user device 1830), virtualization server infrastructure 1810 may receive the end point analysis information associated with the enrolled device (e.g., user device 1830) from an enterprise mobility management server (e.g., enterprise mobility management server 1820).

In some embodiments, the enrolled device may be registered with an enterprise mobility management server to enroll the enrolled device in at least one policy enforcement scheme implemented by the enterprise mobility management server prior to the end point analysis information associated with the enrolled device being received. For example, the enrolled device (e.g., user device 1830) may be registered with an enterprise mobility management server (e.g., enterprise mobility management server 1820) to enroll the enrolled device (e.g., user device 1830) in at least one policy enforcement scheme implemented by the enterprise mobility management server (e.g., enterprise mobility management server 1820) prior to the end point analysis information associated with the enrolled device (e.g., user device 1830) being received.

In some embodiments, receiving the end point analysis information associated with the enrolled device may include receiving a unique device identifier associated with the enrolled device, and the unique device identifier associated with the enrolled device may be generated by the enterprise mobility management server during enrollment of the enrolled device in the at least one policy enforcement scheme implemented by the enterprise mobility management server. For example, in receiving the end point analysis information associated with the enrolled device (e.g., user device 1830), virtualization server infrastructure 1810 may receive a unique device identifier associated with the enrolled device (e.g., user device 1830). In addition, the unique device identifier associated with the enrolled device (e.g., user device 1830) may have been generated by the enterprise mobility management server (e.g., enterprise mobility management server 1820) during enrollment of the enrolled device (e.g., user device 1830) in the at least one policy enforcement scheme implemented by the enterprise mobility management server (e.g., enterprise mobility management server 1820).

In some embodiments, receiving the end point analysis information associated with the enrolled device may include receiving one or more compliance tags generated by an enterprise mobility management server for the enrolled device. For example, in receiving the end point analysis information associated with the enrolled device (e.g., user device 1830), virtualization server infrastructure 1810 may receive one or more compliance tags generated by an enterprise mobility management server (e.g., enterprise mobility management server 1820) for the enrolled device (e.g., user device 1830). For instance, virtualization server infrastructure 1810 may receive one or more compliance tags generated by enterprise mobility management server 1820 for user device 1830 at step 1906 based on the end point analysis performed on user device 1830 by enterprise mobility management server 1820.

In some instances, the one or more compliance tags may be generated by the enterprise mobility management server for the enrolled device based on a mobile device management (MDM) policy enforcement scheme. For example, the one or more compliance tags may be generated by the enterprise mobility management server (e.g., enterprise mobility management server 1820) for the enrolled device (e.g., user device 1830) based on a mobile device management (MDM) policy enforcement scheme (which may, e.g., be implemented by enterprise mobility management server 1820).

In some instances, the one or more compliance tags may be generated by the enterprise mobility management server for the enrolled device based on a mobile application management (MAM) policy enforcement scheme. For example, the one or more compliance tags may be generated by the enterprise mobility management server (e.g., enterprise mobility management server 1820) for the enrolled device (e.g., user device 1830) based on a mobile application management (MAM) policy enforcement scheme (which may, e.g., be implemented by enterprise mobility management server 1820).

In some instances, the one or more compliance tags may be generated by the enterprise mobility management server for the enrolled device based on a mobile content management (MCM) policy enforcement scheme. For example, the one or more compliance tags may be generated by the enterprise mobility management server (e.g., enterprise mobility management server 1820) for the enrolled device (e.g., user device 1830) based on a mobile content management (MCM) policy enforcement scheme (which may, e.g., be implemented by enterprise mobility management server 1820).

At step 1907, virtualization server infrastructure 1810 may analyze the one or more compliance tags associated with the enrolled user device (e.g., user device 1830) requesting the hosted session and/or the other end point analysis information associated with the enrolled user device (e.g., user device 1830) requesting the hosted session (e.g., to determine whether to selectively enable or disable hosted application functionality for user device 1830 based on one or more smart access policies). For example, at step 1907, virtualization server infrastructure 1810 may analyze the end point analysis information associated with the enrolled device (e.g., user device 1830) to determine whether to selectively enable or disable hosted application functionality based on one or more smart access policies. The one or more smart access policies may, for instance, be defined and/or updated by an administrator and may be maintained by virtualization server infrastructure 1810 and/or enterprise mobility management server 1820. In addition, the one or more smart access policies may, for instance, define circumstances in which certain features are selectively enabled in a hosted session (e.g., such as the "Framehawk" high-resolution graphics mode discussed in the examples above) and/or circumstances in which certain features are selectively disabled in a hosted session (e.g., such as the copy-and-paste features, printing features, and/or local drive mapping features discussed in the examples above).

In some embodiments, analyzing the end point analysis information associated with the enrolled device to determine whether to selectively enable or disable the hosted application functionality based on the one or more smart access policies may include determining to enable full hosted application functionality. For example, in analyzing the end point analysis information associated with the enrolled device (e.g., user device 1830) to determine whether to selectively enable or disable the hosted application functionality based on the one or more smart access policies, virtualization server infrastructure 1810 may determine to enable full hosted application functionality (e.g., based on the one or more compliance tags associated with the enrolled user device (e.g., user device 1830) matching one or more circumstances specified in the one or more smart access policies as allowing for full hosted application functionality).

In some embodiments, analyzing the end point analysis information associated with the enrolled device to determine whether to selectively enable or disable the hosted application functionality based on the one or more smart access policies may include determining to enable partial hosted application functionality. For example, in analyzing the end point analysis information associated with the enrolled device (e.g., user device 1830) to determine whether to selectively enable or disable the hosted application functionality based on the one or more smart access policies, virtualization server infrastructure 1810 may determine to enable partial hosted application functionality (e.g., based on the one or more compliance tags associated with the enrolled user device (e.g., user device 1830) matching one or more circumstances specified in the one or more smart access policies as allowing for and/or requiring partial hosted application functionality).

In some embodiments, analyzing the end point analysis information associated with the enrolled device to determine whether to selectively enable or disable the hosted application functionality based on the one or more smart access policies may include determining to disable partial hosted application functionality. For example, in analyzing the end point analysis information associated with the enrolled device (e.g., user device 1830) to determine whether to selectively enable or disable the hosted application functionality based on the one or more smart access policies, virtualization server infrastructure 1810 may determine to disable partial hosted application functionality (e.g., based on the one or more compliance tags associated with the enrolled user device (e.g., user device 1830) matching one or more circumstances specified in the one or more smart access policies as requiring specific hosted application functionality to be disabled).

In some embodiments, analyzing the end point analysis information associated with the enrolled device to determine whether to selectively enable or disable the hosted application functionality based on the one or more smart access policies may include determining to disable full hosted application functionality. For example, in analyzing the end point analysis information associated with the enrolled device (e.g., user device 1830) to determine whether to selectively enable or disable the hosted application functionality based on the one or more smart access policies, virtualization server infrastructure 1810 may determine to disable full hosted application functionality (e.g., based on the one or more compliance tags associated with the enrolled user device (e.g., user device 1830) matching one or more circumstances specified in the one or more smart access policies as requiring full hosted application functionality to be disabled). In these instances, virtualization server infrastructure 1810 may prevent and/or restrict user device 1830 from accessing the hosted session entirely and/or might not initiate a hosted session for user device 1830 in the first instance.

At step 1908, virtualization server infrastructure 1810 may provide a hosted application experience to user device 1830 based on analyzing the one or more compliance tags associated with the enrolled user device (e.g., user device 1830) and/or the other end point analysis information associated with the enrolled user device (e.g., user device 1830). For example, at step 1908, virtualization server infrastructure 1810 may provide, via the communication interface (e.g., communication interface 1816), to the enrolled device (e.g., user device 1830), a hosted application experience based on analyzing the end point analysis information associated with the enrolled device (e.g., user device 1830) and determining whether to selectively enable or disable the hosted application functionality based on the one or more smart access policies.

In providing the hosted application experience to user device 1830, virtualization server infrastructure 1810 may, for example, generate and/or send one or more virtualized and/or remoted user interface graphics associated with one or more hosted applications and/or hosted desktops to user device 1830, in accordance with the hosted application functionality that was selectively enabled and/or disabled at step 1908 based on the end point analysis information and the smart access policies. Additionally or alternatively, in providing the hosted application experience to user device 1830, virtualization server infrastructure 1810 may, for example, receive and/or process input and/or requests received from user device 1830, in accordance with the hosted application functionality that was selectively enabled and/or disabled at step 1908 based on the end point analysis information and the smart access policies.

Figure 20:
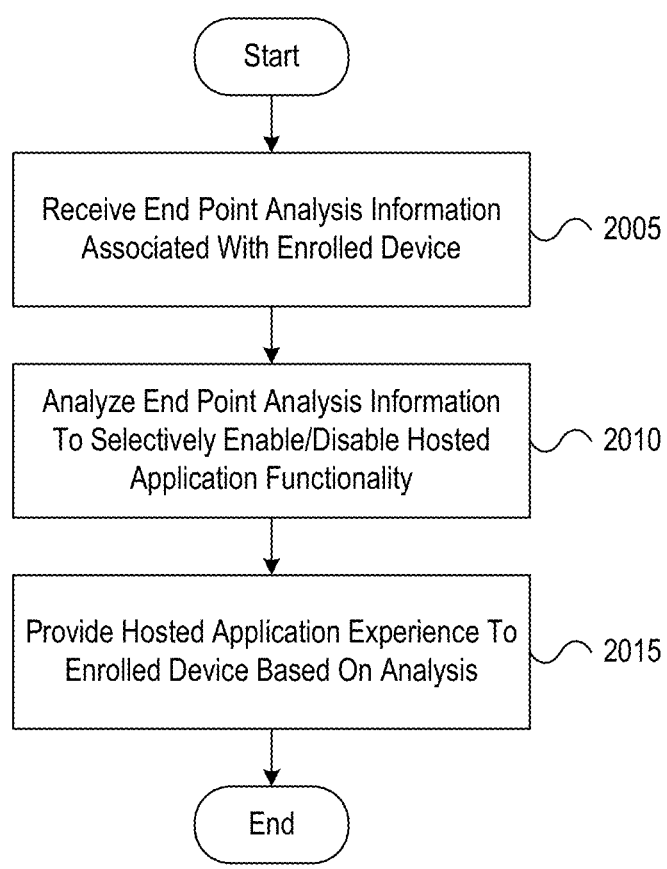
FIG. 20 depicts an example method of providing an enrolled device with smart access to hosted applications in accordance with one or more illustrative aspects described herein.

FIG. 20 depicts an example method of providing an enrolled device with smart access to hosted applications in accordance with one or more illustrative aspects described herein. Referring to FIG. 20, at step 2005, a computing platform having at least one processor, a communication interface, and memory may receive, via the communication interface, end point analysis information associated with an enrolled device. At step 2010, the computing platform may analyze the end point analysis information associated with the enrolled device to determine whether to selectively enable or disable hosted application functionality based on one or more smart access policies. At step 2015, the computing platform may provide, via the communication interface, to the enrolled device, a hosted application experience based on analyzing the end point analysis information associated with the enrolled device and determining whether to selectively enable or disable the hosted application functionality based on the one or more smart access policies.

As illustrated above, various aspects of the disclosure relate to providing mobile devices with smart access to hosted applications. Although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A virtualization server comprising:
   at least one processor;
   a communication interface communicatively coupled to the at least one processor; and
   memory storing computer-readable instructions that, when executed by the at least one processor, cause the virtualization server to:

receive, via the communication interface, end point analysis information associated with an enrolled device, wherein receiving the end point analysis information associated with the enrolled device comprises receiving one or more compliance tags generated by an enterprise mobility management server for the enrolled device, wherein the one or more compliance tags generated by the enterprise mobility management server for the enrolled device indicate whether the enrolled device is in compliance with a set of policies applicable to the enrolled device;

analyze the end point analysis information associated with the enrolled device to determine whether to selectively enable or disable hosted application functionality based on one or more smart access policies and the one or more compliance tags generated by the enterprise mobility management server for the enrolled device; and provide, via the communication interface, to the enrolled device, a hosted application experience based on analyzing the end point analysis information associated with the enrolled device and determining whether to selectively enable or disable the hosted application functionality based on the one or more smart access policies and the one or more compliance tags generated by the enterprise mobility management server for the enrolled device, wherein providing the hosted application experience to the enrolled device comprises:

executing, at the virtualization server, one or more hosted applications in accordance with the hosted application functionality selectively enabled or disabled based on the one or more smart access policies and the one or more compliance tags generated by the enterprise mobility management server for the enrolled device to generate virtualized user interface graphics associated with the one or more hosted applications; and sending the virtualized user interface graphics associated with the one or more hosted applications to the enrolled device.

2. The virtualization server of claim 1, wherein receiving the end point analysis information associated with the enrolled device comprises receiving the end point analysis information associated with the enrolled device from the enrolled device.

3. The virtualization server of claim 1, wherein receiving the end point analysis information associated with the enrolled device comprises receiving the end point analysis information associated with the enrolled device from the enterprise mobility management server.

4. The virtualization server of claim 1, wherein the enrolled device is registered with the enterprise mobility management server to enroll the enrolled device in at least one policy enforcement scheme implemented by the enterprise mobility management server prior to the end point analysis information associated with the enrolled device being received.

5. The virtualization server of claim 4,
wherein receiving the end point analysis information associated with the enrolled device comprises receiving a unique device identifier associated with the enrolled device, and
wherein the unique device identifier associated with the enrolled device is generated by the enterprise mobility management server during enrollment of the enrolled device in the at least one policy enforcement scheme implemented by the enterprise mobility management server.

6. The virtualization server of claim 1, wherein the one or more compliance tags are generated by the enterprise mobility management server for the enrolled device based on a mobile device management (MDM) policy enforcement scheme.

7. The virtualization server of claim 1, wherein the one or more compliance tags are generated by the enterprise mobility management server for the enrolled device based on a mobile application management (MAM) policy enforcement scheme.

8. The virtualization server of claim 1, wherein the one or more compliance tags are generated by the enterprise mobility management server for the enrolled device based on a mobile content management (MCM) policy enforcement scheme.

9. The virtualization server of claim 1, wherein analyzing the end point analysis information associated with the enrolled device to determine whether to selectively enable or disable the hosted application functionality based on the one or more smart access policies and the one or more compliance tags generated by the enterprise mobility management server for the enrolled device comprises determining to enable full hosted application functionality.

10. The virtualization server of claim 1, wherein analyzing the end point analysis information associated with the enrolled device to determine whether to selectively enable or disable the hosted application functionality based on the one or more smart access policies and the one or more compliance tags generated by the enterprise mobility management server for the enrolled device comprises determining to enable partial hosted application functionality.

11. The virtualization server of claim 1, wherein analyzing the end point analysis information associated with the enrolled device to determine whether to selectively enable or disable the hosted application functionality based on the one or more smart access policies and the one or more compliance tags generated by the enterprise mobility management server for the enrolled device comprises determining to disable partial hosted application functionality.

12. The virtualization server of claim 1, wherein analyzing the end point analysis information associated with the enrolled device to determine whether to selectively enable or disable the hosted application functionality based on the one or more smart access policies and the one or more compliance tags generated by the enterprise mobility management server for the enrolled device comprises determining to disable full hosted application functionality.

13. The virtualization server of claim 1, wherein the one or more compliance tags generated by the enterprise mobility management server for the enrolled device are signed by the enterprise mobility management server using a signing certificate of the enterprise mobility management server.

14. The virtualization server of claim 1, wherein at least one smart access policy of the one or more smart access policies defines circumstances in which local drive mapping features are selectively disabled in a hosted session with the enrolled device.

15. A method comprising:
at a virtualization server comprising at least one processor, a communication interface, and memory:
receiving, by the at least one processor, via the communication interface, end point analysis information associated with an enrolled device, wherein receiving the end point analysis information associated with the enrolled device comprises receiving one or more compliance tags generated by an enterprise mobility management server for the enrolled device, wherein the one or more compliance tags generated by the enterprise mobility management server for the enrolled device indicate whether the enrolled device is in compliance with a set of policies applicable to the enrolled device;

analyzing, by the at least one processor, the end point analysis information associated with the enrolled device to determine whether to selectively enable or disable hosted application functionality based on one or more smart access policies and the one or more compliance tags generated by the enterprise mobility management server for the enrolled device; and providing, by the at least one processor, via the communication interface, to the enrolled device, a hosted application experience based on analyzing the end point analysis information associated with the enrolled device and determining whether to selectively enable or disable the hosted application functionality based on the one or more smart access policies and the one or more compliance tags generated by the enterprise mobility management server for the enrolled device, wherein providing the hosted application experience to the enrolled device comprises:

executing, at the virtualization server, one or more hosted applications in accordance with the hosted application functionality selectively enabled or disabled based on the one or more smart access policies and the one or more compliance tags generated by the enterprise mobility management server for the enrolled device to generate virtualized user interface graphics associated with the one or more hosted applications; and sending the virtualized user interface graphics associated with the one or more hosted applications to the enrolled device.

16. The method of claim 15, wherein receiving the end point analysis information associated with the enrolled device comprises receiving the end point analysis information associated with the enrolled device from the enrolled device.

17. The method of claim 15, wherein receiving the end point analysis information associated with the enrolled device comprises receiving the end point analysis information associated with the enrolled device from the enterprise mobility management server.

18. The method of claim 15, wherein the enrolled device is registered with the enterprise mobility management server to enroll the enrolled device in at least one policy enforcement scheme implemented by the enterprise mobility management server prior to the end point analysis information associated with the enrolled device being received.

19. The method of claim 18,
wherein receiving the end point analysis information associated with the enrolled device comprises receiving a unique device identifier associated with the enrolled device, and wherein the unique device identifier associated with the enrolled device is generated by the enterprise mobility management server during enrollment of the enrolled device in the at least one policy enforcement scheme implemented by the enterprise mobility management server.

20. One or more non-transitory computer-readable media storing instructions that, when executed by a virtualization server comprising at least one processor, memory, and a communication interface, cause the virtualization server to:

receive, via the communication interface, end point analysis information associated with an enrolled device, wherein receiving the end point analysis information associated with the enrolled device comprises receiving one or more compliance tags generated by an enterprise mobility management server for the enrolled device, wherein the one or more compliance tags generated by the enterprise mobility management server for the enrolled device indicate whether the enrolled device is in compliance with a set of policies applicable to the enrolled device;

analyze the end point analysis information associated with the enrolled device to determine whether to selectively enable or disable hosted application functionality based on one or more smart access policies and the one or more compliance tags generated by the enterprise mobility management server for the enrolled device; and provide, via the communication interface, to the enrolled device, a hosted application experience based on analyzing the end point analysis information associated with the enrolled device and determining whether to selectively enable or disable the hosted application functionality based on the one or more smart access policies and the one or more compliance tags generated by the enterprise mobility management server for the enrolled device, wherein providing the hosted application experience to the enrolled device comprises:

executing, at the virtualization server, one or more hosted applications in accordance with the hosted application functionality selectively enabled or disabled based on the one or more smart access policies and the one or more compliance tags generated by the enterprise mobility management server for the enrolled device to generate virtualized user interface graphics associated with the one or more hosted applications; and sending the virtualized user interface graphics associated with the one or more hosted applications to the enrolled device.

* * * * *